US012493657B2

(12) United States Patent
Kwiatkowski et al.

(10) Patent No.: US 12,493,657 B2
(45) Date of Patent: Dec. 9, 2025

(54) CAPTURING EDIT SEMANTICS TO IMPROVE MERGE OUTCOMES

(71) Applicant: Microsoft Technology Licensing, LLC, Redmond, WA (US)

(72) Inventors: Paul Jerome Kwiatkowski, Woodinville, WA (US); Taylor Williams, Seattle, WA (US); Daniel Ryan Lehenbauer, Kenmore, WA (US); Yann Achard, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/144,150

(22) Filed: May 5, 2023

(65) Prior Publication Data

US 2024/0370502 A1 Nov. 7, 2024

(51) Int. Cl.
*G06F 16/93* (2019.01)
(52) U.S. Cl.
CPC .................................. *G06F 16/93* (2019.01)
(58) Field of Classification Search
CPC ......................................................... G06F 16/93
USPC ......................................................... 707/608
See application file for complete search history.

(56) References Cited

U.S. PATENT DOCUMENTS

| 8,965,840 | B2 | 2/2015 | Hagan et al. | |
| 9,202,472 | B1* | 12/2015 | Sharifi | G10L 19/018 |
| 2011/0113326 | A1* | 5/2011 | Baer | G06F 40/194 |
| | | | | 709/204 |
| 2014/0040202 | A1* | 2/2014 | Hagan | G06F 16/178 |
| | | | | 707/634 |
| 2015/0378972 | A1* | 12/2015 | Kapadia | G06F 40/197 |
| | | | | 715/229 |
| 2016/0357720 | A1* | 12/2016 | Thimbleby | G06F 3/1423 |
| 2018/0107369 | A1* | 4/2018 | Soon-Shiong | H04L 65/4015 |
| 2019/0362268 | A1* | 11/2019 | Fogarty | G06N 5/047 |
| 2022/0207115 | A1* | 6/2022 | van Manen | H04N 21/47205 |
| 2023/0061779 | A1* | 3/2023 | Beri | H04L 65/4015 |
| 2023/0259694 | A1* | 8/2023 | Suezawa | G06F 40/197 |
| | | | | 715/256 |

* cited by examiner

*Primary Examiner* — Muluemebet Gurmu

(57) ABSTRACT

Systems and methods for automatically resolving incompatible changes made by different users to collaborative content by capturing changes in the form of command records, where the command records store user changes as context associated with a user command and related content such as a recursive record of the commands called by each command, anchors, creation descriptors, invariant parameters, observations, and constraints. Using the stored command records, systems and methods described herein are able to "rebase" the changes to create a resolved content state even in situations where one user may delete content and another user may later add/edit that otherwise deleted content. The system provides efficient and automatic resolution of incompatible edits based on the context from the command records underlying the user's intent when creating the command. Ultimately, the system increases user productivity by coordinating content creation within the collaborative content automatically.

20 Claims, 16 Drawing Sheets

200

| Item | Units | Cost |
|---|---|---|
| Sugar | 100 | $1.00 |
| Flour | 500 | $3.00 |
| Baking Soda | 50 | $2.50 |

202

| Item | Units | Cost |
|---|---|---|
| Sugar | 100 | $1.00 |
| Flour | 500 | $3.00 |
| Baking Soda | 50 | $2.50 |
| Baking Powder | 25 | $1.00 |

204

| Item | Units | Cost | Total Cost |
|---|---|---|---|
| Sugar | 100 | $1.00 | $100.00 |
| Flour | 500 | $3.00 | $1,500.00 |
| Baking Soda | 50 | $2.50 | $125.00 |

206

| Item | Units | Cost |
|---|---|---|
| Sugar | 100 | $1.00 |
| Flour | 500 | $3.00 |
| Baking Soda | 50 | $2.50 |
| Baking Powder | 25 | $1.00 |

208

| Item | Units | Cost | Total Cost |
|---|---|---|---|
| Sugar | 100 | $1.00 | $100.00 |
| Flour | 500 | $3.00 | $1,500.00 |
| Baking Soda | 50 | $2.50 | $125.00 |
| Baking Powder | 25 | $1.00 | $25.00 |

210

| Item | Units | Cost | Total Cost |
|---|---|---|---|
| Sugar | 100 | $1.00 | $100.00 |
| Flour | 500 | $3.00 | $1,500.00 |
| Baking Soda | 50 | $2.50 | $125.00 |
| Baking Powder | 25 | $1.00 | $25.00 |

202 (table):

| Item | Units | Cost |
|---|---|---|
| Sugar | 100 | $1.00 |
| Flour | 500 | $3.00 |
| Baking Soda | 50 | $2.50 |

204 (table):

| Item | Units | Cost |
|---|---|---|
| Sugar | 100 | $1.00 |
| Flour | 500 | $3.00 |
| Baking Soda | 50 | $2.50 |
| Baking Powder | 25 | $1.00 |

206 (table):

| Item | Units | Cost | Total Cost |
|---|---|---|---|
| Sugar | 100 | $1.00 | $100.00 |
| Flour | 500 | $3.00 | $1,500.00 |
| Baking Soda | 50 | $2.50 | $125.00 |

208 (table):

| Item | Units | Cost | Total Cost |
|---|---|---|---|
| Sugar | 100 | $1.00 | $75.00 |
| Flour | 500 | $3.00 | $1,500.00 |
| Baking Soda | 50 | $2.50 | $125.00 |

210 (table):

| Item | Units | Cost |
|---|---|---|
| Sugar | 100 | $1.00 |
| Flour | 500 | $3.00 |
| Baking Soda | 50 | $2.50 |
| Baking Powder | 25 | $1.00 |

212 (table):

| Item | Units | Cost | Total Cost |
|---|---|---|---|
| Sugar | 100 | $1.00 | $75.00 |
| Flour | 500 | $3.00 | $1,500.00 |
| Baking Soda | 50 | $2.50 | $125.00 |
| Baking Powder | 25 | $1.00 | $25.00 |

212 (table):

| Item | Units | Cost | Total Cost |
|---|---|---|---|
| Sugar | 100 | $1.00 | $75.00 |
| Flour | 500 | $3.00 | $1,500.00 |
| Baking Soda | 50 | $2.50 | $125.00 |
| Baking Powder | 25 | $1.00 | $25.00 |

FIG. 2B

Table 202 (near figure 102)

| Item | Units | Cost |
|---|---|---|
| Sugar | 100 | $1.00 |
| Flour | 500 | $3.00 |
| Baking Soda | 50 | $2.50 |

Table 204

| Item | Units | Cost |
|---|---|---|
| Sugar | 100 | $1.00 |
| Flour | 500 | $3.00 |
| Baking Soda | 50 | $2.50 |
| Baking Powder | 25 | $1.00 |

Table 206 (near figure 104)

| Item | Units | Cost | Total Cost |
|---|---|---|---|
| Sugar | 100 | $1.00 | $100.00 |
| Flour | 500 | $3.00 | $1,500.00 |
| Baking Soda | 50 | $2.50 | $125.00 |

Table 208

| Item | Units | Cost | Total Cost |
|---|---|---|---|
| Sugar | 100 | $1.00 | $100.00 |
| Baking Soda | 50 | $2.50 | $125.00 |
| Flour | 500 | $3.00 | $1,500.00 |

Table 210

| Item | Units | Cost |
|---|---|---|
| Sugar | 100 | $1.00 |
| Flour | 500 | $3.00 |
| Baking Soda | 50 | $2.50 |
| Baking Powder | 25 | $1.00 |

Table 212 (upper)

| Item | Units | Cost | Total Cost |
|---|---|---|---|
| Baking Powder | 25 | $1.00 | $25.00 |
| Sugar | 100 | $1.00 | $100.00 |
| Baking Soda | 50 | $2.50 | $125.00 |
| Flour | 500 | $3.00 | $1,500.00 |

Table 212 (lower)

| Item | Units | Cost | Total Cost |
|---|---|---|---|
| Baking Powder | 25 | $1.00 | $25.00 |
| Sugar | 100 | $1.00 | $100.00 |
| Baking Soda | 50 | $2.50 | $125.00 |
| Flour | 500 | $3.00 | $1,500.00 |

Table (202):

| Item | Amount | Price |
|---|---|---|
| Sugar | 100 | $1.00 |
| Flour | 500 | $3.00 |
| Baking Soda | 50 | $2.50 |
| Baking Powder | 25 | $1.00 |

Table (204):

| Item | Units | Cost |
|---|---|---|
| Sugar | 100 | $1.00 |
| Flour | 500 | $3.00 |
| Baking Soda | 50 | $2.50 |

Table (206):

| Item | Units | Cost | Total Cost |
|---|---|---|---|
| Sugar | 100 | $1.00 | $100.00 |
| Flour | 500 | $3.00 | $1,500.00 |
| Baking Soda | 50 | $2.50 | $125.00 |

Table (208):

| Item | Amount | Price |
|---|---|---|
| Sugar | 100 | $1.00 |
| Flour | 500 | $3.00 |
| Baking Soda | 50 | $2.50 |
| Baking Powder | 25 | $1.00 |

Table (210):

| Item | Amount | Price | Total Cost |
|---|---|---|---|
| Sugar | 100 | $1.00 | $100.00 |
| Flour | 500 | $3.00 | $1,500.00 |
| Baking Soda | 50 | $2.50 | $125.00 |
| Baking Powder | 25 | $1.00 | $25.00 |

Table (210):

| Item | Amount | Price | Total Cost |
|---|---|---|---|
| Sugar | 100 | $1.00 | $100.00 |
| Flour | 500 | $3.00 | $1,500.00 |
| Baking Soda | 50 | $2.50 | $125.00 |
| Baking Powder | 25 | $1.00 | $25.00 |

CAPTURING EDIT SEMANTICS TO IMPROVE MERGE OUTCOMES

BACKGROUND

Remote and hybrid work options as well as travel requirements in the modern workplace often result in individuals editing the same piece of collaborative content, such as a document, from distant locations. This can create an issue of two people editing the same portion of the collaborative content without knowing about the other person's edits. As a result, the two edits may be incompatible with each other, and it can be difficult to know whose edits should be retained in the document and/or in what order the edits should be applied to the document. Moreover, based on the order chosen, the intent of one or more users may be lost when multiple, independent edits are made in sequence, such as when one user adds a row to a spreadsheet while another user adds a column. Strict application of applying edits in order does not contend with the cell where the new row and the new column intersect. Manually resolving the incompatible edits is often an inefficient use of resources, potentially delaying the completion of the document.

It is with respect to these and other general considerations that examples have been described. Also, although relatively specific problems have been discussed, it should be understood that the examples should not be limited to solving the specific problems identified in the background.

SUMMARY

Aspects of the present disclosure relate to systems and methods for automatically resolving incompatible changes made by different users in a piece of collaborative content by capturing changes in the form of command records, where the command records store separate user changes as context associated with a user command and related content, e.g., "add" may be the command and content may be some identified content to be added. Using the stored command records, systems and methods described herein are able to "rebase" the changes to create a resolved content state even in situations where one user may add some content such as a row and another user may later add different content such as a column.

Aspects of the present disclosure relate to the use of an incompatibility resolution engine (IRE) to evaluate conflicting or incompatible edits to best determine the intent of the users. The IRE will analyze the edits and rebase one or more of them to resolve the incompatibility and create a resolved content state for the collaborative content. The IRE may utilize one or more of the command records associated with an edit in its analysis. The system provides efficient and automatic resolution of incompatible edits based on the context from the command records underlying the user's intent when creating the command. Ultimately, the system increases user productivity by coordinating content creation within the collaborative content automatically.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIGS. 2A-F illustrate examples for resolving incompatible edits using an IRE, according to aspects described herein.

DETAILED DESCRIPTION

Figure 1:
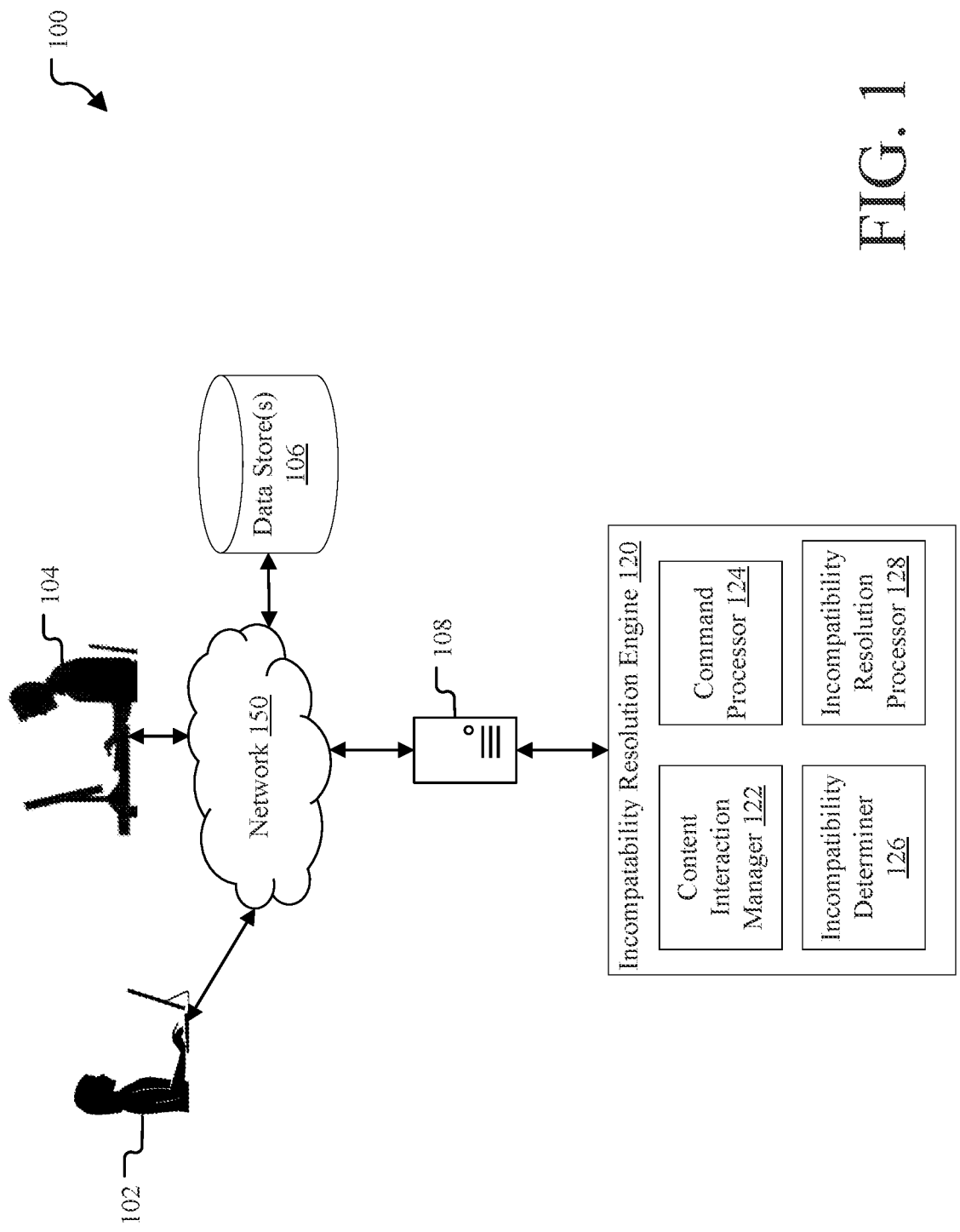
FIG. 1 is an exemplary environment for resolving incompatible edits using an IRE on a server, according to aspects described herein.

In the following detailed description, references are made to the accompanying drawings that form a part hereof, and in which are shown by way of illustrations and specific examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The expansion of network capabilities and remote work options mean that many users often work on the same piece of content collaboratively but also separately, independently, and substantially simultaneously. When multiple users are working on content together (e.g., document, spreadsheet, slideshow, etc.), they often enter commands or edits that modify similar sections of the content without awareness of other users' commands or edits. The lack of awareness may occur due to network delays, users working offline, working on a local copy of the content, and/or merging their modifications to the content asynchronously.

In some instances, one or more commands received relatively simultaneously may be incompatible with each other, meaning the commands are either not capable of coexisting within the content together or the edits/commands may create incomplete, defective, and/or conflicting results. For example, one or more users may be working in the same spreadsheet and both realize that portion of a table should be modified. A first user may enter one or more commands that modify the content by adding rows or columns and/or sorting the content. A second user may substantially simultaneously enter one or more commands, such as equations to the spreadsheet that modify the content putting the content in a second content state. When the users save their work, or the content is updated for each user, an issue may arise because the two different commands and content states are incompatible with each other and need to be resolved into a unified content state. Often, this requires manual review by the first and/or second user to determine how the commands should be applied. The process is often inefficient requiring rounds of updated drafts back and forth and even meetings to create a resolved content state that users can continue working from. In other instances, the commands may be resolved according to logical rules and/or first in time rules, but these methods often create chaotic outputs that don't capture either user's intent when entering a command. The result is frustrated users having to return to a manual review of a third command that only adds to the confusion without resolving the content.

To address these issues, examples described herein introduce systems and methods for automatically resolving incompatible commands made by different users in a piece of collaborative content by rebasing one or more of the commands and associated command context to create a resolved content state. When a user provides a command, the system records contextual information relating to the command and stores it as one or more command records. As will be described in greater detail in FIG. 1, command records may include one or more of anchors, creation descriptors, invariant parameters, observations, constraints, a recursive record of the commands called by each command, and/or a universal identifier. As will be appreciated by one having skill in the art, while described with respect to FIG. 1, the description of the command records is equally applicable in each configuration applying an IRE disclosed herein.

The edit captures both the command and the user's context, via the command records, at the moment the command was entered. The edit may be transmitted to the IRE in order to update the collaborative content for each user. In the disclosed system when two edits are incompatible the system may provide the edits to an IRE to resolve the incompatibility based at least in part on the user's intent communicated through the command records. In examples, the IRE will analyze the edits, apply one of them to the content, and rebase the other one to resolve the incompatibility and create a resolved content state. The rebasing reapplies an edit to the content when the content is in a content state that is different from when the edit was originally applied by utilizing one or more of the command records associated with the edit in the process. In this way, the reapplication may capture user intent and produce a resolved edit and resolved content state without the need for manual review or inconsistent rules-based approaches. The resolved edit and/or resolved content state are then transmitted to the users and any modifications to commands are stored for reference.

The present disclosure provides several benefits in improving outcomes between incompatible commands in collaborative content. One is that the system efficiently resolves incompatible commands based on user intent. This provides confidence for a user to know their work will not be lost or for little purpose if it is incompatible with another user's work. Additionally, the IRE progresses the technology beyond a first in time methodology, meaning an edit may be received last out of many edits, yet based on the command records have just as much impact on the resolved content state as any other edit, as discussed in more detail below. Further, while manual review is still an option, users are reviewing a proposed resolved edit, meaning they are not having to generate a first draft of the resolved content themselves which improves efficiency. Ultimately, the system increases productivity by enabling users of collaborative content to continue working on the content while any incompatibilities are automatically resolved based on combined user intent.

FIG. 1 is an exemplary environment for resolving incompatible edits using an IRE on a server, according to aspects described herein. System 100 includes user devices 102 and 104, data store 106, a server 108, and an IRE 120. Each of the user devices 102 and 104, one or more data stores 106, a server 108, and an IRE 120 may be connected on a network 150 via one or more of a wired connection, a Wi-Fi connection, and/or a cellular data connection. The network 150 may comprise one or more networks such as local area networks (LANs), wide area networks (WANs), a near-field communications network, a cellular broadband network, point-to-point network, a Wi-Fi network, enterprise network, the Internet, etc. and may include one or more of wired, wireless, and/or optical portions.

IRE 120 is hosted on the server 108 in system 100, such that the user devices 102 and 104 transmit edits with an associated content state to the server 108 for processing by the IRE 120. The IRE 120 includes one or more of a content interaction manager 122, command processor 124, incompatibility determiner 126, and incompatibility resolution processor 128. In examples, the content interaction manager 122 may coordinate the flow of edits, content states, resolved edits, and resolved content states between the user devices 102 and 104 and the IRE 120. In examples, the content interaction manager 122 may receive a first edit with a first content state from user device 102 and a second edit with a second content state from user device 104. The first and second edits may have one or more commands and associated command records contained in the edit.

The one or more command records are a collection of data that relate to the context surrounding the command at the moment it was entered and capture at least some of the user's intent when making the command. Command records store separate user changes as context associated with a user command and related content. such as a recursive record of the commands called by each command, anchors, creation descriptors, invariant parameters, observations, and constraints. Command records may include one or more of the anchors, creation descriptors, invariant parameters, observations, constraints, and a recursive record of the commands called by each command. Commands are structured so that they may be invoked by the IRE 120 to resolve incompatible edits. Each command has a UUID, which is a type of command record that is a stable identifier for the specific command. When provided with a UUID, the IRE 120 will invoke the command associated with the UUID and the associated command records.

The command records have specific known semantics which may be utilized by the IRE 120. An anchor is a descriptor of a portion of the data structure within the content that is being modified. The anchors are understood by the collaboration system and/or at least plug-ins to the collaboration system that support specific distributed data structures. A command that modifies the content will have at least one anchor command record. In some instances, an anchor may be altered when an edit is applied or rebased in content.

A creation descriptor is an optional command record that identifies new data which has been added to the content. The creation descriptor provides useful context associated with the new data entered into the content for a rebasing operation. For example, when a command introduces new data to content, creation descriptors may be generated that apply to and describe the new data. Subsequent reapplications and/or rebases of the command may want to use the same anchors that reference this created data. To facilitate identification of the anchors, even in a content state that is different than when the original command was applied, the creation descriptors can be utilized to reference portions of the created data to make it identifiable so that the same anchor points can be created when possible. In additional examples, a subsequent reapplication may re-use portions of the previously created content instead when the corresponding portions of the new created content have identical descriptors.

Observations are optional command records that a command may provide to the incompatibility resolution processor 128 as it executes in the content. Later, if the command is rebased as part of an edit, the incompatibility resolution processor 128 may pass the observations back to the command to facilitate its resolution. The observations may be primarily utilized during rebasing scenarios but may also be used to recover a user's work if the command logic cannot be completely reapplied. In such an instance, the observation may produce output that reflects the outcome from the original application of the edit and/or command.

Invariant parameters are optional serializable data capturing user intent that is unlikely to change when the command is rebased. The invariant parameters are opaque to the IRE 120 and generally are not used to encode information conveyed by any of the other kinds of command records.

Some command records may be emitted by the command to be recorded as part of an edit. The emitted command records are constraints and a recursive record of the commands called by each command. Constraints are optional descriptors of conditions that must be true for the command to be applicable. The collaboration system may include some default, or implicit constraints to a command such as that the anchor command records must be resolvable to entities within the content. A command that emits constraints shows an awareness by the command author who entered the command of the possibility of rebasing or reapplication occurring in the collaborative context. In some examples, constraints may make the conditions for reapplying the command more restrictive by communicating that if the content state differs in certain ways from the content state when the command was provided, then the user's intent will no longer apply. The restrictive constraints limit the available rebasing options for the incompatibility resolution processor 128 as it tries to maintain user intent during a rebase operation. Alternatively, constraints may make the conditions for reapplying the command more permissive by communicating that the command can accommodate modifications that would by default prevent the command from being reapplied and thus impact the user's intent. Typically, the permissive constraint provides the benefit of enabling the user's work to be preserved in some partial form during a rebase operation.

The recursive record of commands is a hierarchy of lower-level commands called by each command. The recursive record of commands is typically provided for primitive operations, and for many higher level operations such as a sort command. They are records for any commands that the given command invoked as part of its operation. The primitive operations used to alter the content's data structures may be considered to be such commands, in which case the leaves of a recorded "edit tree" will be "primitive commands." The records for the primitive commands also contain data that allow the content to be placed in a content state before the command was applied. For example, an associated command can be "unapplied" meaning the content may be returned to the content state it was in immediately before the command was applied, and vice versa. Retaining the record of the commands between the top-level command and the primitive operations is optional but may be useful when the original command instructions are not available in a rebase scenario. In this instance, rather than discarding the entire recursive record of the command, lower-level commands within the recursive record may be rebased such that the imperfect outcome may still preserve some of the user's work and intent for the content. The recursive record of commands may also be used when the original command cannot complete with the new content state (e.g., because the original command's anchor is deleted), but there are many commands in the recursive record which can be preserved and applied based on the hierarchy of commands recursive records.

As will be appreciated by one having skill in the art, while described with respect to FIG. 1, the description of the command records is equally applicable in each configuration applying a content resolution engine disclosed herein.

The incompatibility determiner 126 may determine whether the one or more received edits are incompatible with each other. The determination may be made based on the relationship of the edits with its underlying commands and command records to the piece of content itself. The simplest case is when two edits are related to different sections of the document, the incompatibility determiner 126 will determine that the edits are compatible and pass them to the command processor 124 for application to the content and a resolved content state. However, when the edits are related to the same portion of the content from the original content state, as evidenced by the command records, the incompatibility determiner 126 will analyze the edits and command records to determine if the edits, while related to the same section of the content may be applied directly without the need for rebasing. In some instances that will be the case and the edits will be passed to the command processor 124 to be applied to the content. Often however, the edits will be incompatible meaning they cannot both be applied to the content directly and one of them must be rebased to produce a resolved edit in a resolved content state. In this instance, the edits will be passed to the incompatibility resolution processor 128 to rebase that edit, i.e., to determine the user's intent and apply that edit to resolve the incompatibility.

When the incompatibility resolution processor 128 receives incompatible edits, it will initially determine which edit was received by the server 108 first, making it the first edit, and which was received by the server 108 second, making it the second edit. Then the incompatibility resolution processor 128 will apply the first edit to the content to create a first content state as modified by the first edit.

Once the first content state is created the incompatibility resolution processor 128 will rebase the second edit based on the second set of command records. To rebase the second edit initially the second set of command records is analyzed to determine the user's intent in making the second edit. Variations in anchor points, invariant parameters, observations, etc. may be analyzed to determine the impact of the first edit to the anchors used by the second edit, and adjusts the anchors as required. It also consults the constraints to see if the second edit has any descriptors that may be applicable. Then the first content state is analyzed to determine which portions of the second edit are affected by, and therefore incompatible with, the second edit. This may be a result of a portion of the content being deleted, or the modification of the first edit so changing the structure of the content that the second edit cannot be easily reapplied.

If there are portions of the second edit that are affected the incompatibility resolution processor 128 will modify the second edit by adjusting the commands in the edit so that it can be reapplied to the content while maintaining as much of the user's intent as possible. The incompatibility resolution processor 128 may utilize one or more heuristics in addition to the command records and second edit intent to make the modification. The heuristics may be values associated with enterprise defined rules, locally defined best business practices, content type, methods for adjusting anchor points, and/or other values to handle specific patterns of conflicting changes that are known to occur in a given modification type. Portions of the second edit that are modified out, will be saved, and stored in data store 106 for future reference. The modification of the second edit, and the modified underlying commands, is the incompatibility resolution processor's 128 attempt to create a modified second edit that, when applied to the first content state, produces a resolved content state that would have resulted if the second user had been editing the content in the first content state after the first user provided their edit. Once the second edit is modified, it will be applied to the first content state to produce a resolved edit in a resolved content state. The resolved edit is the series of commands and command records which can be applied to the content to produce the resolved content state. Thus, the resolved content state is the content state following the application of the resolved edit. The content interaction manager 122 will transmit the resolved edit and resolved content state to the user devices 102 and 104 when it is completed.

In examples, the user devices 102 and 104 may be any of a variety of user devices, including, but not limited to, a mobile computing device, a laptop computing device, a tablet computing device, a desktop computing device, a video game computing device, a virtual reality computing device, vehicle computer, and/or any device which may be used in combination with a display. User devices 102 and 104 may be configured to execute one or more applications (not pictured) and/or services and/or manage hardware resources (e.g., processors, memory, etc.), which may be utilized by viewers of the user devices 102 and 104. The user devices 102 and 104 can send and receive content data as input or output which may be, for example from a microphone, an image capture device (e.g., a camera), a global positioning system (GPS), etc., that transmits content data, a computer-executed program that generates content data, and/or memory with data stored therein corresponding to content data. The content data may include visual content data, audio content data (e.g., speech or ambient noise), a viewer-input, such as a voice query, text query, etc., an image, an action performed by a viewer and/or a device, a computer command, a programmatic evaluation gaze content data, calendar entries, emails, document data (e.g., a virtual document), weather data, news data, blog data, encyclopedia data and/or other types of private and/or public data that may be recognized by those of ordinary skill in the art. In some examples, the content data may include text, source code, commands, skills, or programmatic evaluations.

User devices 102 and 104 may each include at least one processor, such as command processor 124, that executes software and/or firmware stored in memory. The software/firmware code contains instructions that, when executed by the processor causes control logic to perform the functions described herein. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the examples, various logic may be implemented in any appropriate fashion and would remain in accordance with the examples herein disclosed In accordance with some aspects, the user devices 102 and 104 may have access to data contained in a data store 106, as well as the ability to store data in data store 106. The data store 106 may contain a plurality of content related to resolving incompatible commands to collaborative content. Data store 106 may be a network server, cloud server, network attached storage ("NAS") device, or another suitable computing device. Data store 106 may include one or more of any types of storage mechanism or memory, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. In some instances, the data store 106 may be configured as an embedding object memory. Although only one instance of the data store 106 is shown in FIG. 1, the system 100 may include two, three, or more similar instances of the data store 114. Moreover, the network 150 may provide access to other data stores similar to data store 106 that are located outside of the system 100, in some examples.

In some examples, the network 150 can be any suitable communication network or combination of communication networks. For example, network 150 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, network 150 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

As will be appreciated, the various methods, devices, apps, nodes, features, etc., described with respect to FIG. 1 or any of the figures described herein, are not intended to limit the system to being performed by the particular applications and features described. Accordingly, additional configurations may be used to practice the methods and systems herein and/or features and apps described may be excluded without departing from the methods and systems disclosed herein.

Figure 2E:
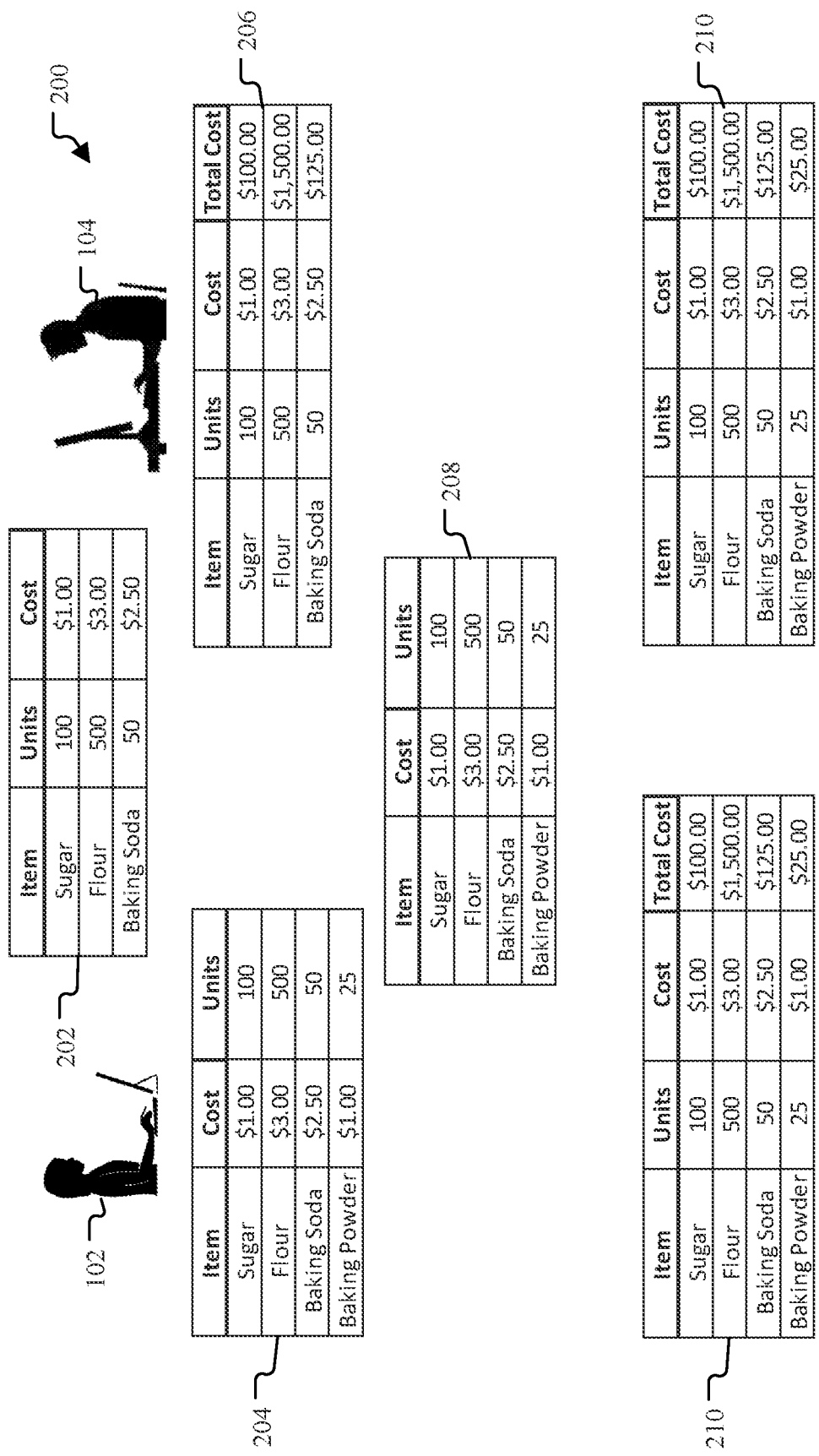

FIGS. 2A-F illustrate examples for resolving incompatible edits using an IRE, according to aspects described herein. FIG. 2A illustrates an example for resolving incompatible edits using an IRE using anchors, according to aspects described herein. In examples, a first user at a user device 102 and a second user at a second user device 104 may be working on a piece of collaborative content such as spreadsheet 202. Spreadsheet 202 may relate to business expenses for a bakery. The first user may provide a command to user device 102 to add an additional row to spreadsheet 202 for "baking powder" with associated Units and Cost, creating spreadsheet 204 in a first content state. When the command to create spreadsheet 204 is provided the system 200 may collect one or more command records associated with the command, such as anchors. The user device 102 may create a first edit based on the first command and first command records. The first edit may be transmitted to the IRE, while the first user on the user device 102 continues viewing spreadsheet 204.

At substantially the same time, the second user on the user device 106 may provide a second command to modify the spreadsheet 202 by adding an additional column for total cost of each item, creating spreadsheet 206 in a second content state. Again, when the second command is provided a second set of command records may be collected that are associated with the second command. For example, the command records may be an anchor point for the Units column which could be the adjacent column Cost. A second edit based on the second command and second set of command records may be created. The second edit may be transmitted to the IRE after the first edit is transmitted.

The IRE upon receiving the two edits will initially determine if the edits are incompatible. In this example, the two edits are incompatible because the first edit includes the entered row modifying the spreadsheet and the second edit has the total cost equation. To resolve the incompatibility the IRE will unapply the second edit, apply the first edit to the content creating spreadsheet 208 in a first content state that matches the content state of spreadsheet 204. Then, the IRE will rebase the second edit based on the second set of command records and second edit intent. For example, the anchors may be provided to maintain the Unit column adjacent to the Cost column of the spreadsheet. When the second edit command is run the spreadsheet 210 is created in a resolved content state. The hierarchy of commands and associated command records used to create the resolved content state will be collected to create a resolved edit. The resolved edit will be transmitted by the IRE to the user device 102 and user device 104 who will apply the resolved edit to spreadsheet 204 and spreadsheet 206 respectively, to create spreadsheet 210 in resolved content state on both user devices 102 and 104. Thus, the outcome of this rebasing operation was to utilize each user's intent, as relayed via the command records, to create a spreadsheet 210 in a resolved content state that replicates the likely outcome of the second user providing the second command to the spreadsheet 204. Stated differently, the spreadsheet 210 would have been the likely outcome if the second user had provided the second command to the spreadsheet 204.

FIG. 2B illustrates an example for resolving incompatible edits using an IRE using creation descriptors, according to aspects described herein. In examples, a first user at a user device 102 and a second user at a second user device 104 may be working on a piece of collaborative content such as spreadsheet 202. Spreadsheet 202 may relate to business expenses for a bakery. The first user may provide a command to user device 102 to add an additional row to spreadsheet 202 for "baking powder" with associated Units and Cost, creating spreadsheet 204 in a first content state. When the command to create spreadsheet 204 is provided the system 200 may collect one or more command records associated with the command, such as creation descriptions. The user device 102 may create a first edit based on the first command and first command records. The first edit may be transmitted to the IRE, while the first user on the user device 102 continues viewing spreadsheet 204.

At substantially the same time, the second user on the user device 106 may provide a second command to modify the spreadsheet 202 by adding an additional column for total cost of each item and then providing a command to include a 75% multiplier command on just the Sugar Total Cost cell to account for a discount they received on the sugar. This multiplier command could adjust the value in the Sugar cell to $75, creating spreadsheet 206 in a second content state. Again, when the second command is provided a second set of command records may be collected that are associated with the second command. For example, the command records may be creation descriptors about the content created by the command such as cell contents for the cells relating to Total Cost for Sugar, Flour, and Baking Soda. A second edit based on the second command and second set of command records may be created. The second edit may be transmitted to the IRE after the first edit is transmitted.

The IRE upon receiving the two edits will initially determine if the edits are incompatible. In this example, the two edits are incompatible because the first edit includes the entered row modifying the spreadsheet and the second edit has the total cost equation and multiplier command. To resolve the incompatibility the IRE will unapply the second edit, apply the first edit to the content creating spreadsheet 210 in a first content state that matches the content state of spreadsheet 204. Then, the IRE will rebase the second edit based on the second set of command records and second edit intent. For example, the creation descriptors may be provided such that the Flour, Baking Soda, and Baking Powder Total Cost equations would not have the 75% multiplier command, but the Sugar Total Cost equation would, which would align with user intent. This may occur whatever command order the IRE utilized in the reapplication. For example, whether the system maintained the original equations for the Total Cost cells to perform the reapplication or created new equations but updated the subsequent edits to modify the equations instead. When the second edit command is run the spreadsheet 212 is created in a resolved content state. The hierarchy of commands and associated command records used to create the resolved content state will be collected to create a resolved edit. The resolved edit will be transmitted by the IRE to the user device 102 and user device 104 who will apply the resolved edit to spreadsheet 204 and spreadsheet 206 respectively, to create spreadsheet 212 in resolved content state on both user devices 102 and 104. Thus, the outcome of this rebasing operation was to utilize each user's intent, as relayed via the command records, to create a spreadsheet 212 in a resolved content state that replicates the likely outcome of the second user providing the second command to the spreadsheet 204. Stated differently, the spreadsheet 212 would have been the likely outcome if the second user had provided the second command to the spreadsheet 204.

FIG. 2C illustrates an example for resolving incompatible edits using an IRE using invariant parameters, according to aspects described herein. In examples, a first user at a user device 102 and a second user at a second user device 104 may be working on a piece of collaborative content such as spreadsheet 202. Spreadsheet 202 may relate to business expenses for a bakery. The first user may provide a command to user device 102 to add an additional row to spreadsheet 202 for "baking powder" with associated Units and Cost, creating spreadsheet 204 in a first content state. When the command to create spreadsheet 204 is provided the system 200 may collect one or more command records associated with the command, such as invariant parameters. The user device 102 may create a first edit based on the first command and first command records. The first edit may be transmitted to the IRE, while the first user on the user device 102 continues viewing spreadsheet 204.

At substantially the same time, the second user on the user device 106 may provide a second command to modify the spreadsheet 202 by adding an additional column for total cost of each item and then providing a command to sort the rows by total cost in ascending order, meaning lowest to highest, creating spreadsheet 208 in a second content state. Again, when the second command is provided a second set of command records may be collected that are associated with the second command. For example, the command records may be invariant parameters capturing the conditional nature of the ascending sort command would be collected. A second edit based on the second command and second set of command records may be created. The second edit may be transmitted to the IRE after the first edit is transmitted.

The IRE upon receiving the two edits will initially determine if the edits are incompatible. In this example, the two edits are incompatible because the first edit includes the entered row modifying the spreadsheet and the second edit has the total cost equation and sort command. To resolve the incompatibility the IRE will unapply the second edit, apply the first edit to the content creating spreadsheet 210 in a first content state that matches the content state of spreadsheet 204. Then, the IRE will rebase the second edit based on the second set of command records and second edit intent. For example, the invariant parameters would be provided during reapply to maintain the rows in the sorted ascending order and including the baking powder. When the second edit command is run the spreadsheet 212 is created in a resolved content state. The hierarchy of commands and associated command records used to create the resolved content state will be collected to create a resolved edit. The resolved edit will be transmitted by the IRE to the user device 102 and user device 104 who will apply the resolved edit to spreadsheet 204 and spreadsheet 206 respectively, to create spreadsheet 212 in resolved content state on both user devices 102 and 104. Thus, the outcome of this rebasing operation was to utilize each user's intent, as relayed via the command records, to create a spreadsheet 212 in a resolved content state that replicates the likely outcome of the second user providing the second command to the spreadsheet 204. Stated differently, the spreadsheet 212 would have been the likely outcome if the second user had provided the second command to the spreadsheet 204.

FIG. 2D illustrates an example for resolving incompatible edits using an IRE using observations, according to aspects described herein. In examples, a first user at a user device 102 and a second user at a second user device 104 may be working on a piece of collaborative content such as spreadsheet 202. Spreadsheet 202 may relate to business expenses for a bakery. The first user may provide a command to user device 102 to add an additional row to spreadsheet 202 for "baking powder" with associated Units and Cost and then provided commands that renamed the Units and Cost columns to contain strings that the heuristics wouldn't have recognized, such as in spreadsheet 204 where the first user changed Units to Amount and Cost to Price, creating spreadsheet 204 in a first content state. When the command to create spreadsheet 204 is provided the system 200 may collect one or more command records associated with the command, such as observations. The user device 102 may create a first edit based on the first command and first command records. The first edit may be transmitted to the IRE, while the first user on the user device 102 continues viewing spreadsheet 204.

At substantially the same time, the second user on the user device 106 may provide a second command to modify the spreadsheet 202 by adding an additional column for total cost of each item where the command is "add total cost column", creating spreadsheet 206 in a second content state. Again, when the second command is provided a second set of command records may be collected that are associated with the second command. For example, the command records may be an observation where the command would inspect the column names to determine which two columns are to be multiplied together, using heuristics. It could record its choice of columns using observations to the Units and Cost columns with associated UUIDs. A second edit based on the second command and second set of command records may be created. The second edit may be transmitted to the IRE after the first edit is transmitted.

The IRE upon receiving the two edits will initially determine if the edits are incompatible. In this example, the two edits are incompatible because the first edit includes the entered row modifying the spreadsheet with name change command and the second edit has the total cost equation. To resolve the incompatibility the IRE will unapply the second edit, apply the first edit to the content creating spreadsheet 208 in a first content state that matches the content state of spreadsheet 204. Then, the IRE will rebase the second edit based on the second set of command records and second edit intent. For example, the observations could be utilized to provide a sufficient indicator of user intent that Amount, and Price are modified names for the UUIDs associated with the column locations within the equations. When the second edit command is run the spreadsheet 210 is created in a resolved content state. The hierarchy of commands and associated command records used to create the resolved content state will be collected to create a resolved edit. The resolved edit will be transmitted by the IRE to the user device 102 and user device 104 who will apply the resolved edit to spreadsheet 204 and spreadsheet 206 respectively, to create spreadsheet 210 in resolved content state on both user devices 102 and 104. Thus, the outcome of this rebasing operation was to utilize each user's intent, as relayed via the command records, to create a spreadsheet 210 in a resolved content state that replicates the likely outcome of the second user providing the second command to the spreadsheet 204. Stated differently, the spreadsheet 210 would have been the likely outcome if the second user had provided the second command to the spreadsheet 204.

FIG. 2E illustrates an example for resolving incompatible edits using an IRE using constraints, according to aspects described herein. In examples, a first user at a user device 102 and a second user at a second user device 104 may be working on a piece of collaborative content such as spreadsheet 202. Spreadsheet 202 may relate to business expenses for a bakery. The first user may provide a command to user device 102 to add an additional row to spreadsheet 202 for "baking powder" with associated Units and Cost and then a command that reverses the order of cells to Cost then Unit, creating spreadsheet 204 in a first content state. When the command to create spreadsheet 204 is provided the system 200 may collect one or more command records associated with the command, such as observations. The user device 102 may create a first edit based on the first command and first command records. The first edit may be transmitted to the IRE, while the first user on the user device 102 continues viewing spreadsheet 204.

At substantially the same time, the second user on the user device 106 may provide a second command to modify the spreadsheet 202 by adding an additional column for total cost of each item, creating spreadsheet 206 in a second content state. Again, when the second command is provided a second set of command records may be collected that are associated with the second command. For example, the command records may be a constraint which may be collected relating to Unit and Cost such that when the user enters the Total Cost equation for the equation to function correctly constraints may be added that specify that the Unit and Cost need to remain in order as columns Unit then Cost. A second edit based on the second command and second set of command records may be created. The second edit may be transmitted to the IRE after the first edit is transmitted.

The IRE upon receiving the two edits will initially determine if the edits are incompatible. In this example, the two edits are incompatible because the first edit includes the entered row modifying the spreadsheet with the reverse command and the second edit has the total cost equation. To resolve the incompatibility the IRE will unapply the second edit, apply the first edit to the content creating spreadsheet 208 in a first content state that matches the content state of spreadsheet 204. Then, the IRE will rebase the second edit based on the second set of command records and second edit intent. For example, the constraint can be provided to maintain the second users order of Unit then Cost so that the Total Cost equation functions correctly. When the second edit command is run the spreadsheet 210 is created in a resolved content state. The hierarchy of commands and associated command records used to create the resolved content state will be collected to create a resolved edit. The resolved edit will be transmitted by the IRE to the user device 102 and user device 104 who will apply the resolved edit to spreadsheet 204 and spreadsheet 206 respectively, to create spreadsheet 210 in resolved content state on both user devices 102 and 104. Thus, the outcome of this rebasing operation was to utilize each user's intent, as relayed via the command records, to create a spreadsheet 210 in a resolved content state that replicates the likely outcome of the second user providing the second command to the spreadsheet 204. Stated differently, the spreadsheet 210 would have been the likely outcome if the second user had provided the second command to the spreadsheet 204.

Figure 2F:
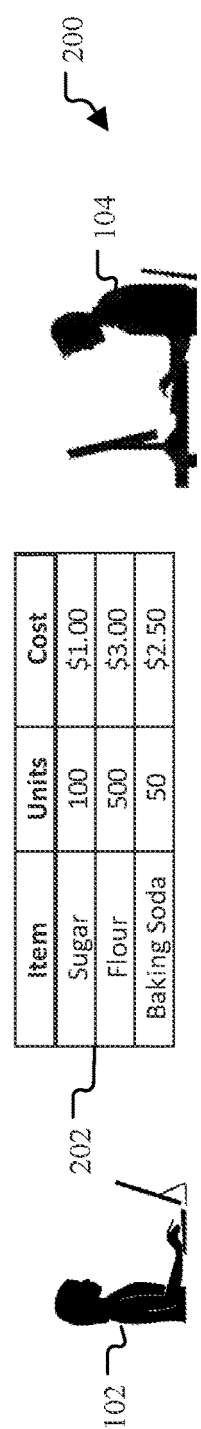

FIG. 2F illustrates an example for resolving incompatible edits using an IRE using creation descriptors, according to aspects described herein. In examples, a first user at a user device 102 and a second user at a second user device 104 may be working on a piece of collaborative content such as spreadsheet 202. Spreadsheet 202 may relate to business expenses for a bakery. The first user may provide a command to user device 102 to delete the Flour and Baking Soda rows then add an additional row to spreadsheet 202 for "baking powder" with associated Units and Cost, creating spreadsheet 204 in a first content state. When the command to create spreadsheet 204 is provided the system 200 may collect one or more command records associated with the command, such as a recursive record of commands. The user device 102 may create a first edit based on the first command and first command records. The first edit may be transmitted to the IRE, while the first user on the user device 102 continues viewing spreadsheet 204.

At substantially the same time, the second user on the user device 106 may provide a second command to modify the spreadsheet 202 by adding an additional column for total cost of each item and then providing a command to include a 75% multiplier command on just the Sugar Total Cost cell to account for a discount they received on the sugar. This multiplier command could adjust the value in the Sugar cell to $75, creating spreadsheet 206 in a second content state. Again, when the second command is provided a second set of command records may be collected that are associated with the second command. For example, the command records may be a recursive record of the commands of the first user and second user while providing commands. A second edit based on the second command and second set of command records may be created. The second edit may be transmitted to the IRE after the first edit is transmitted.

The IRE upon receiving the two edits will initially determine if the edits are incompatible. In this example, the two edits are incompatible because the first edit includes the deleted rows with the added row commands and the second edit has the total cost equation and multiplier command. To resolve the incompatibility the IRE will unapply the second edit, apply the first edit to the content creating spreadsheet 210 in a first content state that matches the content state of spreadsheet 204. Then, the IRE will rebase the second edit based on the second set of command records and second edit intent. For example, the recursive record of the second user's commands can be utilized so that the Total Cost equation with the multiplier is only applied to the Sugar row while the Baking Powder row does not have the multiplier command. In the absence of the second users recursive record, the intent evidenced by the lower-level commands for Flour and Baking Soda, to have the Total Cost equation applied without the multiplier command, would have been lost. Without the observation, the Total Cost equation with the multiplier command could have been misapplied to Baking Powder. When the second edit command is run the spreadsheet 212 is created in a resolved content state. The hierarchy of commands and associated command records used to create the resolved content state will be collected to create a resolved edit. The resolved edit will be transmitted by the IRE to the user device 102 and user device 104 who will apply the resolved edit to spreadsheet 204 and spreadsheet 206 respectively, to create spreadsheet 212 in resolved content state on both user devices 102 and 104. Thus, the outcome of this rebasing operation was to utilize each user's intent, as relayed via the command records, to create a spreadsheet 212 in a resolved content state that replicates the likely outcome of the second user providing the second command to the spreadsheet 204. Stated differently, the spreadsheet 212 would have been the likely outcome if the second user had provided the second command to the spreadsheet 204.

Figure 3:
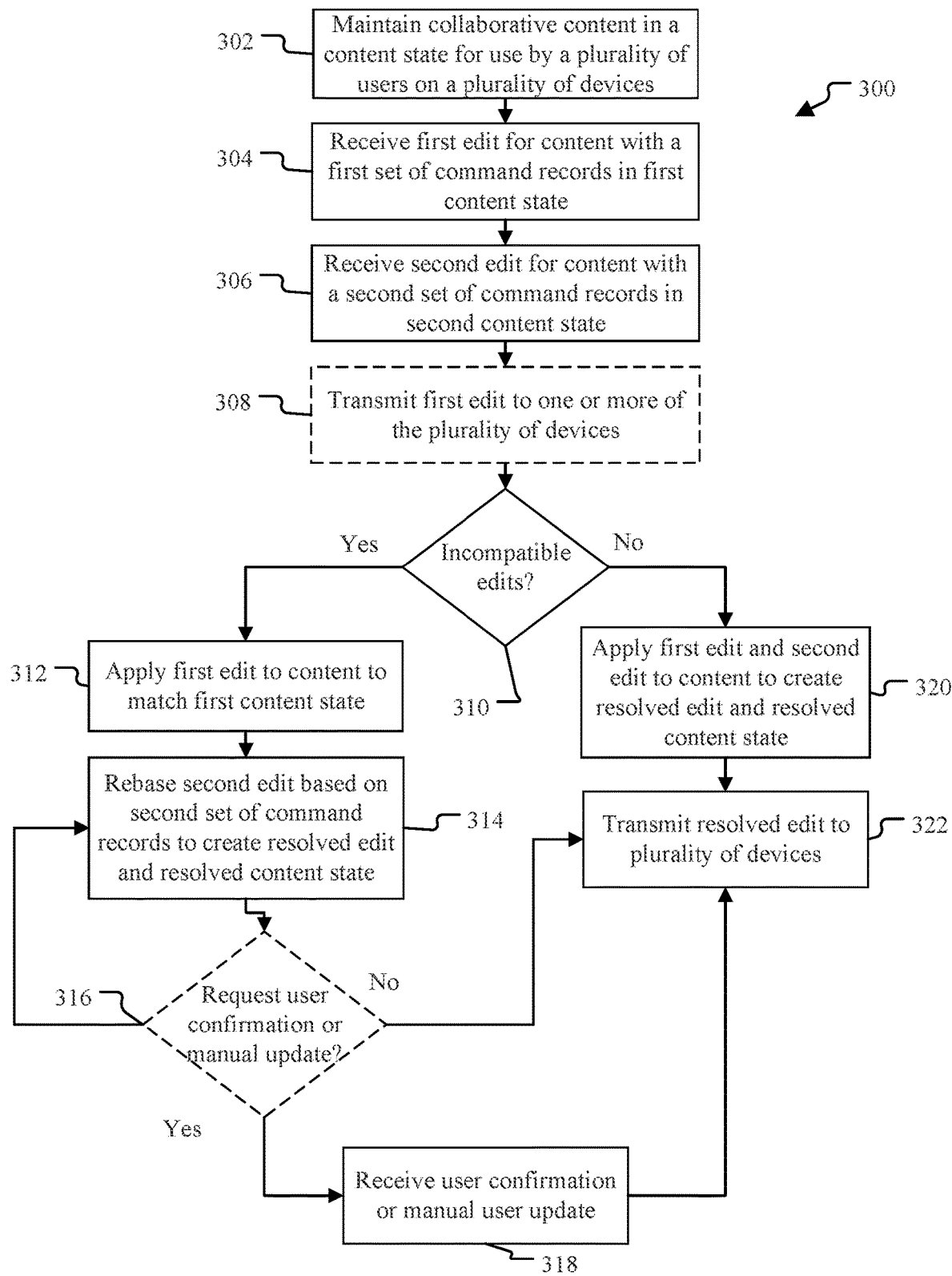
FIG. 3 is a block diagram for resolving incompatible edits using an IRE on a server, according to aspects described herein.

FIG. 3 is a block diagram for resolving incompatible edits using an IRE on a server, according to aspects described herein. The method 300 can be executed as computer-executable instructions executed by a computer system and encoded or stored on a computer readable medium or other non-transitory computer storage media. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with the present disclosure.

At operation 302, a piece of collaborative content is maintained in a content state for use by a plurality of users on a plurality of devices by a server (e.g., server 108). The server in this context may be an active server having an IRE (e.g., IRE 120) hosted on the server. A plurality of users on a plurality of user devices (e.g., user devices 102 and 104) may be providing one or more commands with associated command records to the content to create local content states with a plurality of edits.

At operation 304, the server (e.g., server 108) may receive a first edit for the content from a user device (e.g., user device 102). The first edit may have one or more commands and an associated first set of command records modifying the content to a first content state. The first edit may be received at a first time. At operation 306, the server may receive a second edit for the content from a user device (e.g., user device 104). The second edit may have one or more commands and an associated second set of command records modifying the content to a first content state. The second edit may be received a time after the first edit is received.

Optionally, at operation 308, the server (e.g., server 108) may transmit the first edit to one or more of the computing devices (e.g., computing devices 102 and 104). The first edit may be transmitted to provide an update of recent edits to the content. If the local content is in the same state as the transmitted edit, as is the case for the local content on user device 102 and the first edit, the local device may disregard the first edit. Alternatively, if the local content is in a different content state than the transmitted edit, as is the case between the local content on user device 104 and the first edit, then the local device may be prepared to receive a resolved edit in the future.

At operation 310 it is determined if the edits are incompatible by the incompatibility determiner (e.g., incompatibility determiner 126). Edits are incompatible when they cannot both be applied to the content directly to create a resolved content state that would have likely occurred based on the user's intent. The determination may be made based on the relationship of the edits with their underlying commands and command records to the piece of content itself.

When the two edits are compatible, meaning the user's intent can be captured in a resolved edit without rebasing, then flow progresses to operation 320, where the first edit and second edit are applied to the content by a command processor (e.g., command processor 124) to create a resolved edit and a resolved content state. The two edits may be compatible when the incompatibility determiner (e.g., incompatibility determiner 126) determines that the edits are not directed towards the same section of the content and/or that the command records provide sufficient context on user intent that rebasing is not required, among other examples. At operation 322, the server (e.g., server 108) transmits the resolved edit to the user devices (e.g., user device 102 and 104) for application to the local content state. When the resolved edit is applied across the system, the content states at the server and the user devices should be the resolved content state.

Returning to operation 310, the incompatibility determiner's (e.g., incompatibility determiner 126) analysis may indicate that the edits are incompatible. This may be for a variety of reasons such as the anchors for an edit are deleted and/or significantly modified by another edit, the edits conflict in their resolution of the same section of content (e.g., the first edit modifies the second, the second edit modifies the same section), the edits modify a section of the content via different commands with different outcomes such that neither edit has a command to complete the content based on the other user's intent, as is described with respect to FIG. 2, and/or a plurality of other reasons why edits may be incompatible.

When the incompatibility determiner determines that the first edit and second edit are incompatible, flow progresses to operation 312 where the incompatibility resolution processor (e.g., incompatibility resolution processor 128) may apply the first edit received by the server (e.g., server 108) to the content. In this case, the server would apply the first edit to the content to create a first content state. The first edit received is applied because the incompatibility resolution processor is working to produce an outcome that likely matches the outcome that would have occurred if the second edit were applied by the second user to the first content state. Thus, in order to get to a position where the second edit can be applied to the first content state the incompatibility resolution processor creates the first content state on the server by applying the first edit.

At operation 314, incompatibility resolution processor (e.g., incompatibility resolution processor 128) rebases the second edit on the content in a first content state based on the second set of command records. As will be explained in greater detail in FIG. 4, the incompatibility resolution processor utilizes the second set of command records to determine user intent for the second edit, analyzes the first content state to see which aspects of the content have changed relative to the second edit, modifies the second edit as required to maintain as much of the second user's intent as possible, then applies the modified second edit to the first content state to create a resolved edit and a resolved content state. The goal of the content resolution engine is to create a resolved edit and a resolved content state that would likely match the content state that would exist if the second user had applied the second commands directly to the first content state with the user's own inherent knowledge of intent.

At operation 316, the server (e.g., server 108) may optionally request user confirmation of the resolved edit and the resolved content state and/or that the user provide a manual update to resolve the incompatibility by transmitting a notification to one or more of the user devices (e.g., user devices 102 and 104) to view and confirm the resolved edit and resolved content state. If the notification is sent flow progresses to operation 318, where the user may provide input on their respective user device to confirm or reject the resolved edit and/or resolved content state as well as providing a manual update to resolve the incompatibility. Operations 316 and 318 are shown with dashed lines to indicate that they are optional and may be omitted.

If at operation 316 the notification requesting user confirmation is not sent, and following operation 318 flow progresses to operation 322, where the server (e.g., server 108) transmits the resolved edit to the user devices (e.g., user device 102 and 104) for application to the local content state. When the resolved edit is applied across the system, the content states at the server and the user devices should be the resolved content state.

Figure 4:
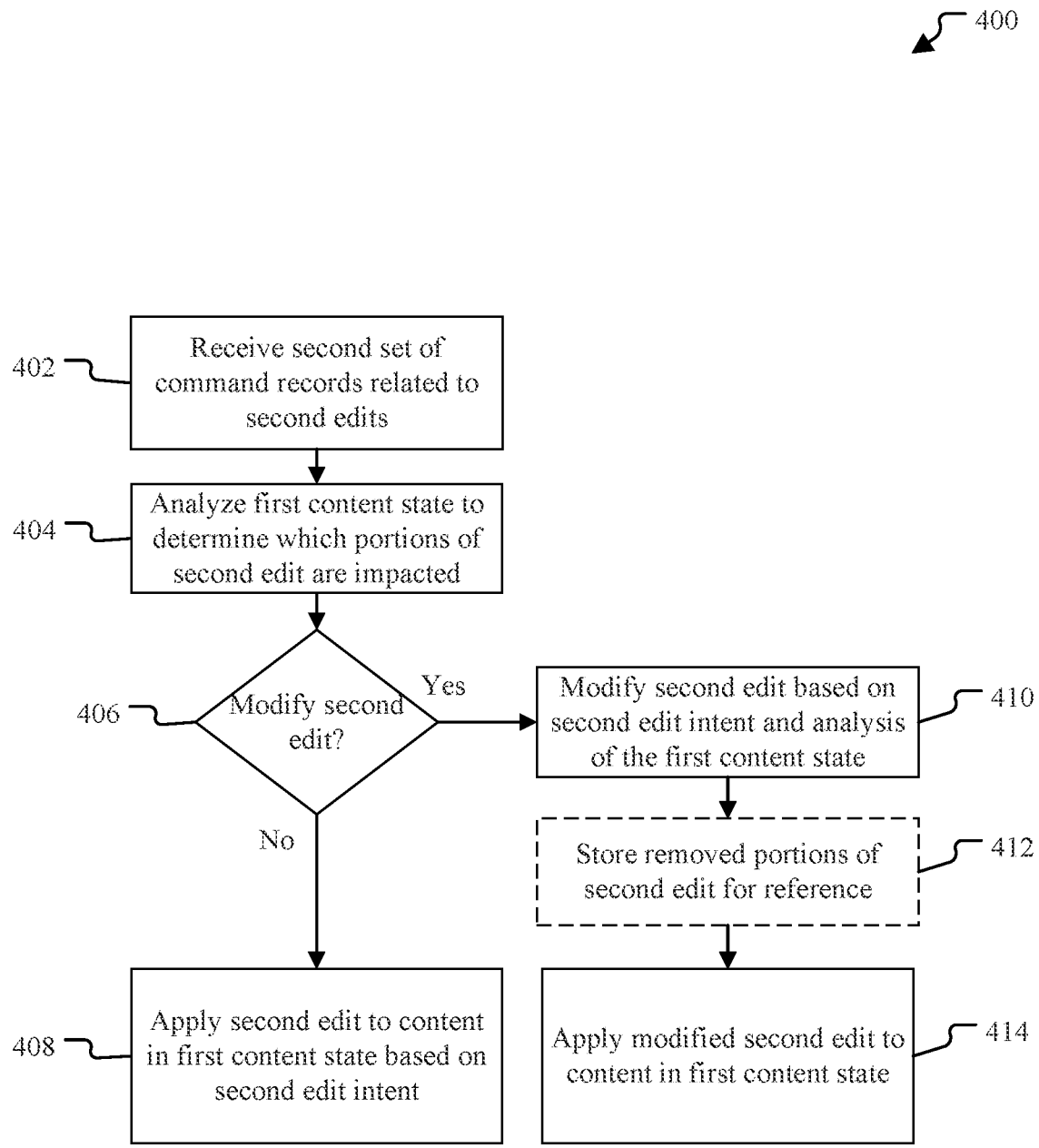
FIG. 4 is a block diagram for rebasing an edit, according to aspects described herein.

FIG. 4 is a block diagram for rebasing an edit, according to aspects described herein. The method 400 can be executed as computer-executable instructions executed by a computer system and encoded or stored on a computer readable medium or other non-transitory computer storage media. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with the present disclosure.

At operation 402, the incompatibility resolution processor (e.g., incompatibility resolution processor 128), receives the second set of command records to incorporate one or more secondary edits. The intent of the second edit may become apparent based on the command records (e.g., variations in anchors, invariant parameters, observations, creation descriptors, how many and what are the sub-commands, etc.). In some contemplated examples, the intent may be determined using one or more aspects of machine learning with the command records as inputs to the machine learning model. Returning to the example from FIG. 2, an analysis of the command records associated with second edit might have an anchor adjustment for the new column, creation descriptors for the equations, etc. Thus, the incompatibility resolution processor might determine that the intent of the second edit was to understand total costs for each row of the spreadsheet (e.g., spreadsheet 206). The intent may then be utilized in subsequent rebasing applications.

As a further example, consider the spreadsheets from FIG. 2, but the second user included an additional sort command to sort the rows of the spreadsheet with the second edit. The sort command therefore would reorder the rows of the spreadsheet with the lowest total cost as the first row and highest total cost as the bottom row. In this case, the second edit now includes an additional set of commands and command records (e.g., new anchor points based on the sort command, etc.) that are dependent on the total cost equation described above to function correctly. The first and second edit will still be incompatible, but now when the incompatibility resolution processor (e.g., incompatibility resolution processor 128) analyzes user intent for the second edit, they will determine an additional aspect of user intent, not just determining total cost but sorting and ordering total cost from lowest to highest.

Flow progresses to operation 404, where the incompatibility resolution processor (e.g., incompatibility resolution processor 128) analyzes the first content state to determine which portions of the second edit are impacted by the modifications to the content made by the first edit. This may be a result of a portion of the content being deleted, or the modification of the first edit so changing the structure of the content that the second edit cannot be easily reapplied. Continuing with the expanded total cost and sort example, the first content state has added a new row with a new item. The new item was not included in the content when the second user's commands were input. Thus, commands likely do not exist to generate a total cost equation for the new row and then sort the new total cost with the existing rows. The incompatibility resolution processor's analysis would recognize these issues. In some examples, the first content state may modify the content without impacting portions of the second edit.

At operation 406 it is determined by the incompatibility resolution processor (e.g., incompatibility resolution processor 128) if the second edit needs to be modified before being applied to the first content state. If the incompatibility resolution processor's analysis at operation 404 returned a result that the second edit was not impacted by the first content state, then the second edit does not need to be modified and flow progresses to operation 408 where the second edit is applied by the incompatibility resolution processor to the first content state based on the second edit intent. In this case, the intent analysis from operation 402 may be sufficient to provide the relevant context and resolve the two edits.

Returning to operation 406, if the second edit does need to be modified, flow progresses to operation 410 where the incompatibility resolution processor (e.g., incompatibility resolution processor 128) may modify the second edit based on the second edit intent and analysis of the first content state. The incompatibility resolution processor will modify the second edit by adjusting the commands in the edit so that it can be reapplied to the content while maintaining as much of the user's intent as possible. The incompatibility resolution processor may utilize one or more heuristics to make the modification. The heuristics may be values associated with enterprise defined rules, locally defined best business practices, content type, methods for adjusting anchor points, and/or other values to handle specific patterns of conflicting changes that are known to occur in a given modification type. This may be the case with respect to the examples relating to FIG. 2. In each instance, modification of the second edit is required to include additional commands to perform the total cost equation for the new row and/or to sort the rows based on the total cost. The modification is needed because the second edit if applied directly to the first content state does not include this sequence of commands and would not likely produce that result without modification. The intent of the user to visualize a total cost and order it would be utilized by the incompatibility resolution processor to generate the additional commands into a modified second edit.

At operation 412, portions of the second edit that are modified out, will be saved, and stored in data store (e.g., data store 106) for future reference. Operation 412 is shown with dashed lines to indicate it is optional and may be omitted.

At operation 414, the modified second edit is applied to the first content state by the incompatibility resolution processor (e.g., incompatibility resolution processor 128). The application of the modified second edit will create a resolved edit in a resolved content state.

Figure 5:
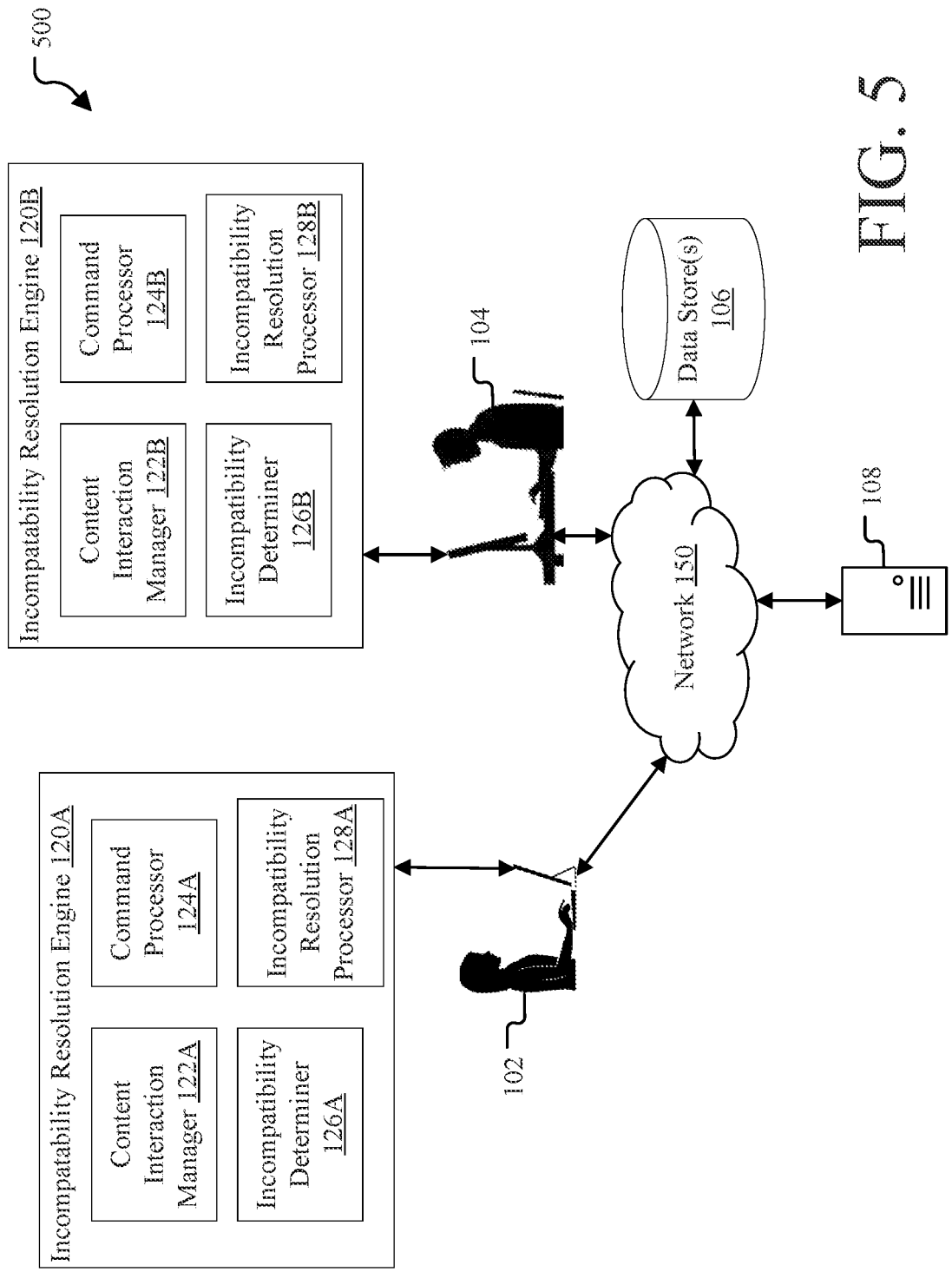
FIG. 5 is an exemplary environment for resolving incompatible edits using an IRE on one or more user devices and a server, according to aspects described herein.

FIG. 5 is an exemplary environment for resolving incompatible edits using an IRE on one or more user devices and a server, according to aspects described herein. The system 500 is comprised of user devices 102 and 104, data store 106, server 108, and IRES 120A-B operably connected and communicating via the network 150. The system 500 is an alternate configuration for the disclosure with an IRE 120A-B hosted on each of the user devices 102 and 104 respectively. The server 108 in the system 500 functions as a sequencing server to transmit the edits back and forth between the user devices 102 and 104. The IRES 120A-B includes one or more of a content interaction manager 122A-B, command processor 124A-B, incompatibility determiner 126A-B, and incompatibility resolution processor 128A-B. As configured in system 500, the command processor 124A-B may collect information relating to one or more command records when the user provides a command to the content and creates an edit including the commands and set of command records. The content interaction managers 122A-B may transmit edits to the server 108 which will sequence and retransmit the edits to the content interaction managers 122A-B on the other user devices, such as user device 104, as the edits are received. In this configuration, the IRES 120A-B can independently rebase commands that are known by all clients in the session and known to be deterministic. Otherwise, the IRES 120A-B may discard the incompatible edit and wait for a rebased version from the originating client. Otherwise, the elements of system 500 function in a substantially similar way to the description of the elements in FIG. 1.

Figure 6:
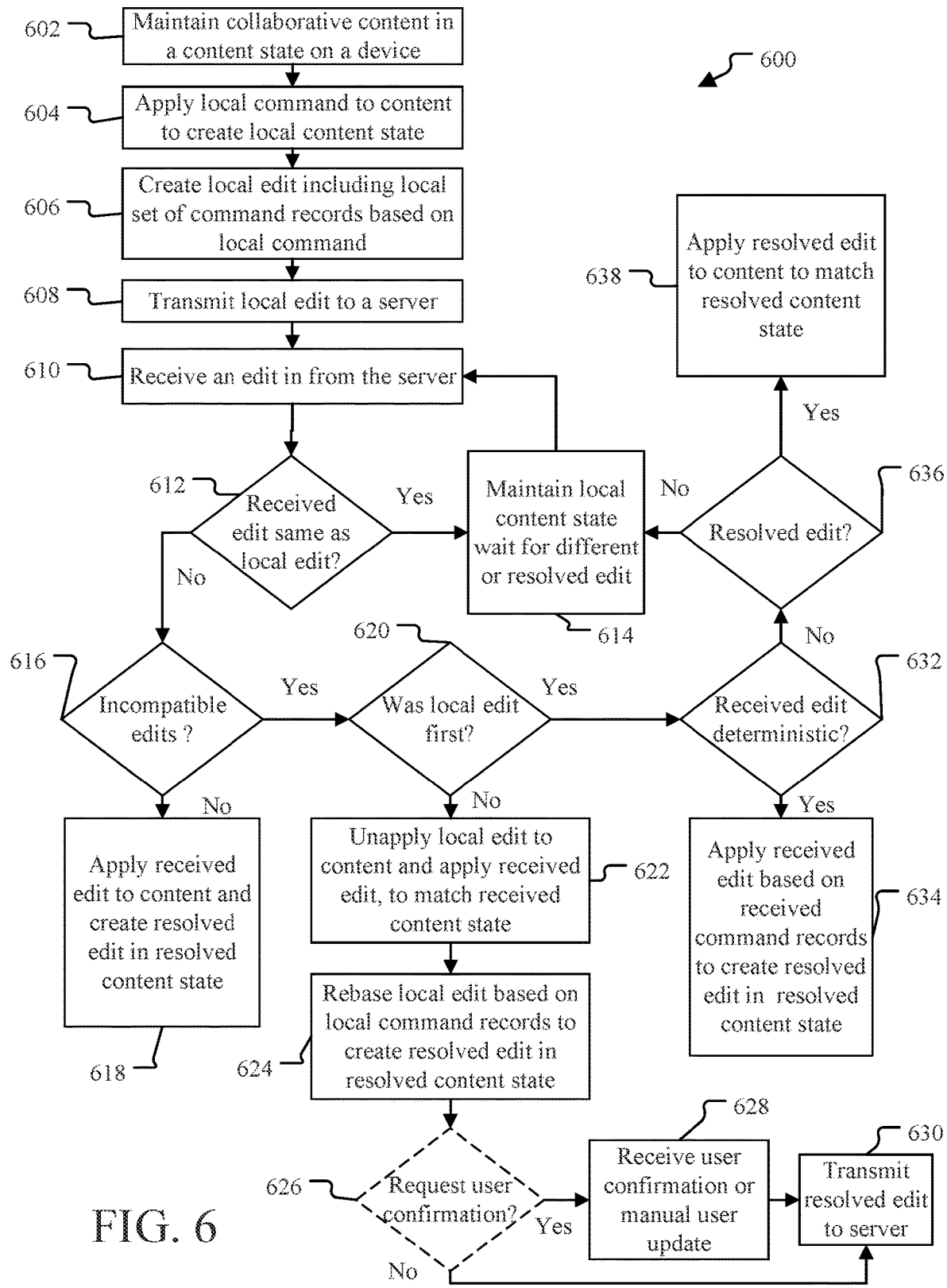
FIG. 6 is a block diagram for resolving incompatible edits using an IRE on one or more user devices and a server, according to aspects described herein.

FIG. 6 is a block diagram for resolving incompatible edits using an IRE on one or more user devices and a server, according to aspects described herein. The method 600 can be executed as computer-executable instructions executed by a computer system and encoded or stored on a computer readable medium or other non-transitory computer storage media. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with the present disclosure.

At operation 602, the collaborative content is maintained on a user device (e.g., user device 102). At operation 604, a local command may be applied to the content to create a local content state on the user device. When the local command is applied one or more command records may be collected by a command processor (e.g., command processor 124A). At operation 606, a local edit may be created including the local set of command records by the command processor. At operation 608, the content interaction manager (e.g., content interaction manager 122A) may transmit the local edit to the server (e.g., server 108) for sequencing and transmission to other user devices (e.g., user device 104).

At operation 610, the content interaction manager (e.g., content interaction manager 122A) may receive an edit from the server (e.g., server 108). At operation 612, it is determined if the received edit is the same as the local edit on the user device. In this instance, the server is a sequencing server, and it receives edits and organizes the received edits based on when they were received. The edits are retransmitted to the other user devices (e.g., user devices 102 and 104) collectively as the server does not identify the edits and thus sends them to each device even if the device was where the edit was created. Thus, at operation 612 if it is determined that the received edit is the same as the local edit on the user device (e.g., user device 102) flow progresses to operation 614, where the content interaction manager (e.g., content interaction manager 122A) will recognize that the received edit is the same as the local edit and maintain the local content state until it receives a different edit.

Returning to operation 612, if the received edit is not the same as the local edit flow progresses to operation 616, where the incompatibility processor (e.g., incompatibility processor 126A) determines if the local edit and received edit are incompatible with each other. If the two edits are compatible with each other, flow progresses to operation 618 where the received edit is applied to the local content state by the command processor (e.g., command processor 124A) to create a resolved edit in a resolved content state. The content interaction manager (e.g., content interaction manager 122A) does not need to transmit the resolved edit and/or the resolved content state because the server will transmit the local edit to the other user devices (e.g., user device 104) and the IRES (e.g., IRE 122B) on that user device (e.g., user device 104) will generate the same resolved content state and resolved edit.

Returning to operation 616, if the two edits are incompatible with each other flow progresses to operation 620 where the content interaction manager (e.g., content interaction manager 122A) determines if the local edit was created first. This may be done by reviewing the time stamp in the UUID associated with the edit. If the local edit was not first, flow progresses to operation 622 where the incompatibility resolution processor (e.g., incompatibility resolution processor 128A) will unapply the local edit to the content and apply the received edit to the content to match the content state associated with the received edit. Flow progresses to operation 624 where the incompatibility resolution processor will rebase the local edit based on the local command records and local command intent to create a resolved edit in a resolved content state.

At operation 626, the content interaction manager (e.g., content interaction manager 122A) may optionally request user confirmation of the resolved edit and the resolved content state and/or that the user provide a manual update to resolve the incompatibility by transmitting a notification to one or more of the user devices (e.g., user devices 102 and 104) to view and confirm the resolved edit and resolved content state. If the notification is sent flow progresses to operation 628, where the user may provide input on their respective user device to confirm or reject the resolved edit and/or resolved content state as well as providing a manual update to resolve the incompatibility. Operations 626 and 628 are shown with dashed lines to indicate that they are optional and may be omitted.

If at operation 626 the notification requesting user confirmation is not sent, and following operation 628 flow progresses to operation 630, where the content interaction manager (e.g., content interaction manager 122A) transmits the resolved edit to the other server (e.g., server 108) for sequencing to the other user device (e.g., user device 104). When the resolved edit is applied, the content states at each device should be the resolved content state.

Returning to operation 620, if the local edit was first, flow progresses to operation 632 where it is determined if the received edit is deterministic. Deterministic edits are those edits that always produce the same outcome when applied to the content. If the received edit is deterministic then flow progresses to operation 634, where the command processor (e.g., command processor 124A) will apply the received edit based on the received command records to create a resolved edit in a resolved content state. Again, because the received edit is deterministic and all user devices (e.g., user devices 102 and 104) have the received edit there is no need to transmit the resolved edit and/or resolved content state because they can be generated at each device.

Returning to operation 632 if the received edit is not deterministic then flow progresses to operation 636, where the content interaction manager (e.g., content interaction manager 122A) determines if the received edit is a resolved edit. In some instances, because the server (e.g., server 108) is a sequencing server it will transmit each edit it receives. As a result, the content interaction manager may receive an edit that is from another user device (e.g., user device 104) that is not a resolved edit but where the local edit occurred first in time. In this instance, because the other user device (e.g., user device 104) has an IRE (e.g., IRE 120B) flow will progress to operation 614 and the content interaction manager will wait until it receives the resolved edit created by the IRE on the other user device and apply that resolved edit.

Returning to operation 636, when the content interaction manager (e.g., content interaction manager 122A) determines that the received edit is the resolved edit, flow progresses to operation 638 where the command processor (e.g., command processor 124A) applies the resolved edit to the content to create the resolved edit. Again, because the received edit is the resolved edit and all user devices (e.g., user devices 102 and 104) have the resolved edit there is no need to transmit the resolved edit and/or resolved content state.

Figure 7:
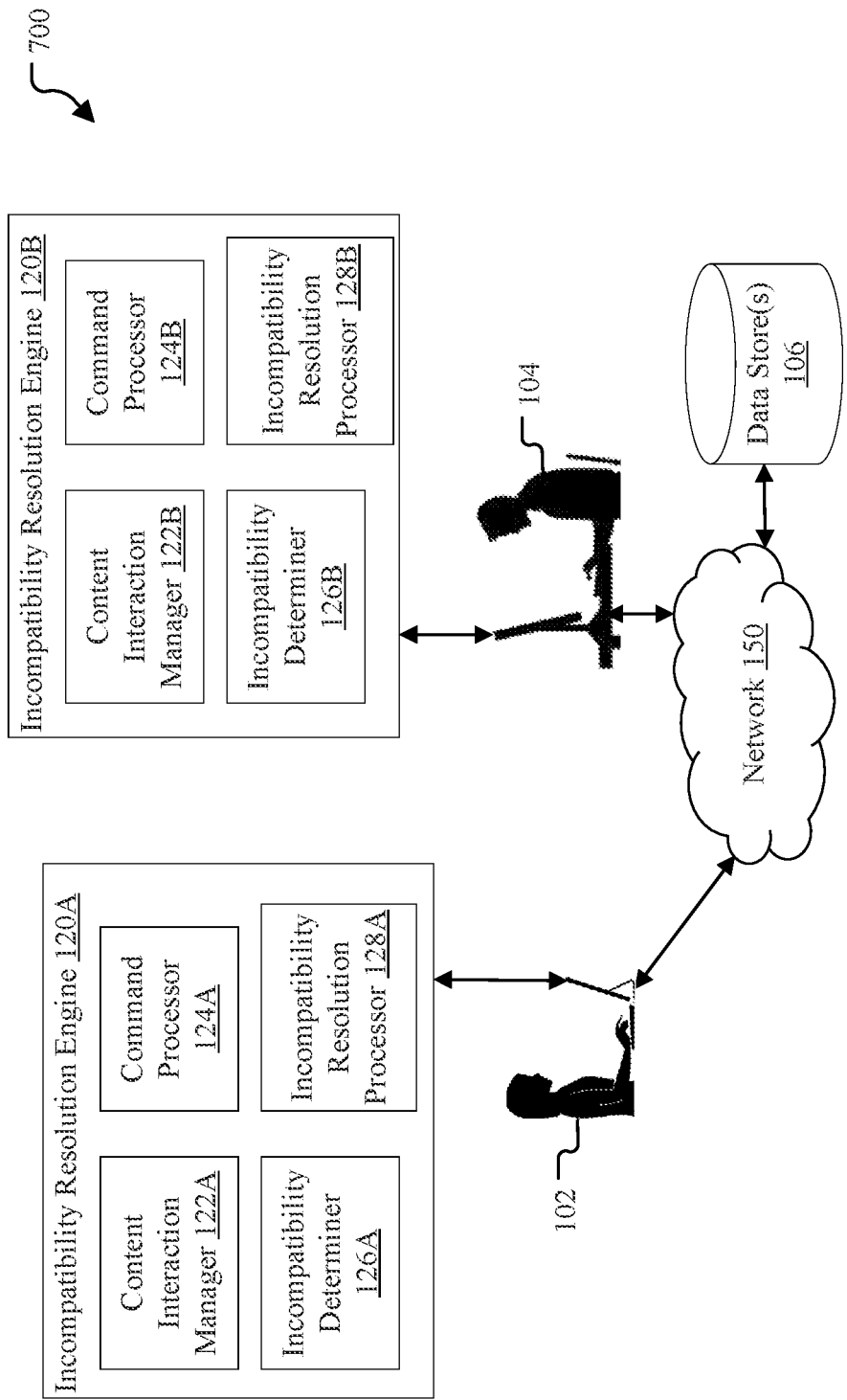
FIG. 7 is an exemplary environment for resolving incompatible edits using an IRE on one or more user devices, according to aspects described herein.

FIG. 7 is an exemplary environment for resolving incompatible edits using an IRE on one or more user devices, according to aspects described herein. The system 700 is comprised of user devices 102 and 104, data store 106, and IRES 120A-B operably connected and communicating via the network 150. The system 700 is an alternate configuration for the disclosure with an IRE 120A-B hosted on each of the user devices 102 and 104 respectively but no server. The IRE 120A-B includes one or more of a content interaction manager 122A-B, command processor 124A-B, incompatibility determiner 126A-B, and incompatibility resolution processor 128A-B. As configured in system 700, the content interaction managers 122A-B may transmit edits to the directly to the other content interaction managers which will sequence and retransmit the edits directly. In this configuration, the IRES 120A-B can independently rebase commands that are known by all clients in the session and known to be deterministic. Otherwise, the IRES 120A-B may discard the incompatible edit and wait for a rebased version from the originating client. Otherwise, the elements of system 700 function in a substantially similar way to the description of the elements in FIGS. 1 and 5.

Figure 8:
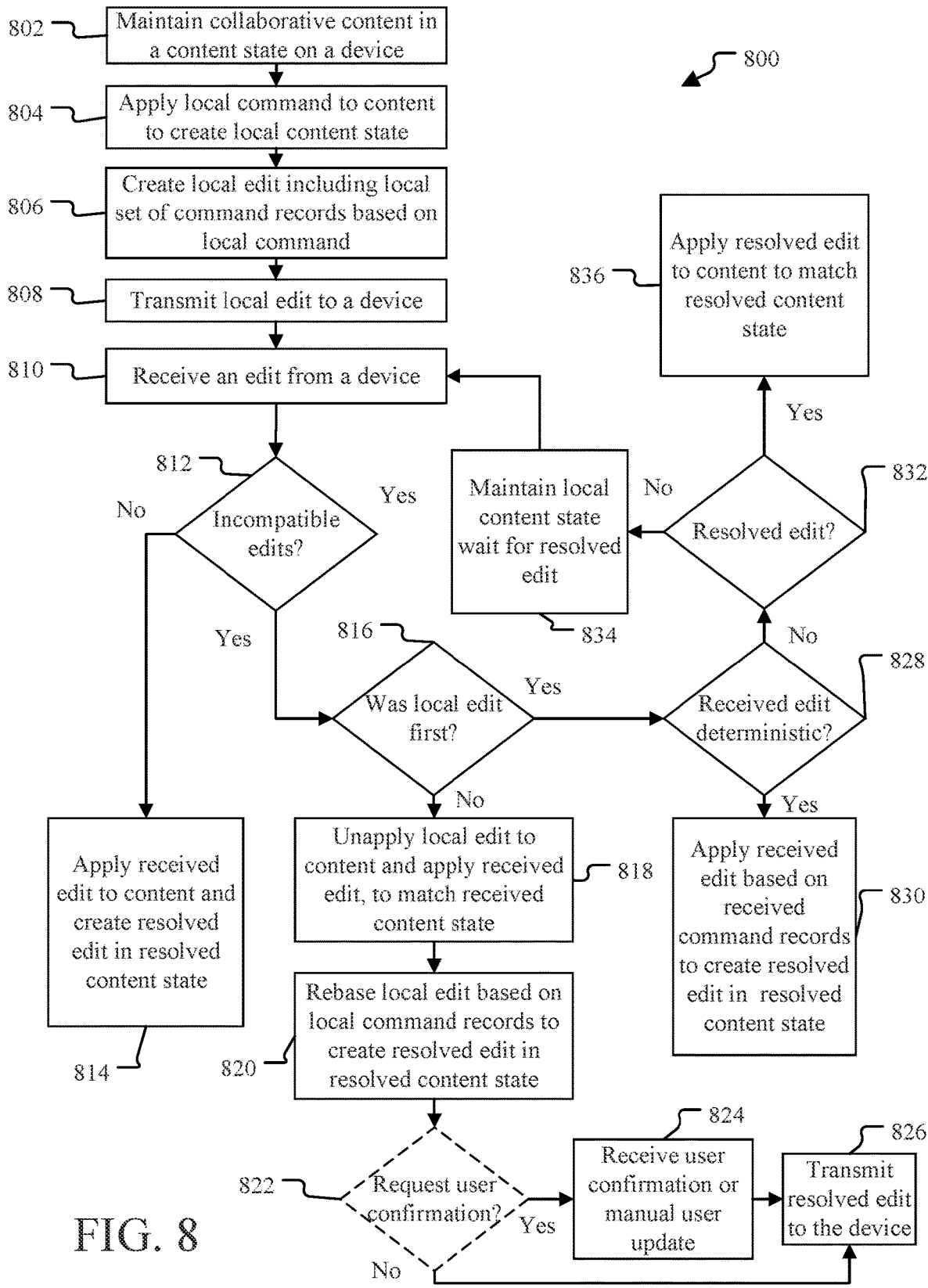
FIG. 8 is a block diagram for resolving incompatible edits using an IRE on one or more user devices, according to aspects described herein.

FIG. 8 is a block diagram for resolving incompatible edits using an IRE on one or more user devices, according to aspects described herein. The method 800 can be executed as computer-executable instructions executed by a computer system and encoded or stored on a computer readable medium or other non-transitory computer storage media. Further, the method 800 can be performed by gates or circuits associated with a processor, an ASIC, an FPGA, a SOC or other hardware device. Hereinafter, the method 800 shall be explained with reference to the systems, components, devices, modules, software, data structures, data characteristic representations, signaling diagrams, methods, etc., described in conjunction with the present disclosure.

At operation 802, the collaborative content is maintained on a user device (e.g., user device 102). At operation 804, a local command may be applied to the content to create a local content state on the user device. When the local command is applied one or more command records may be collected by a command processor (e.g., command processor 124A). At operation 806, a local edit may be created including the local set of command records by the command processor. At operation 808, the content interaction manager (e.g., content interaction manager 122A) may transmit the local edit to another content interaction manager (e.g., content interaction manager 122B).

At operation 810, the content interaction manager (e.g., content interaction manager 122A) may receive an edit from another content interaction manager (e.g., content interaction manager 122B). At operation 812, the incompatibility processor (e.g., incompatibility processor 126A) determines if the local edit and received edit are incompatible with each other. If the two edits are compatible with each other, flow progresses to operation 814 where the received edit is applied to the local content state by the command processor (e.g., command processor 124A) to create a resolved edit in a resolved content state. The content interaction manager (e.g., content interaction manager 122A) does not need to transmit the resolved edit and/or the resolved content state because the IRES (e.g., IRE 122B) on the other user device (e.g., user device 104) will generate the same resolved content state and resolved edit.

Returning to operation 812, if the two edits are incompatible with each other flow progresses to operation 816 where the content interaction manager (e.g., content interaction manager 122A) determines if the local edit was created first. This may be done by reviewing the time stamp in the UUID associated with the edit. If the local edit was not first, flow progresses to operation 818 where the incompatibility resolution processor (e.g., incompatibility resolution processor 128A) will unapply the local edit to the content and apply the received edit to the content to match the content state associated with the received edit. Flow progresses to operation 820 where the incompatibility resolution processor will rebase the local edit based on the local command records and local command intent to create a resolved edit in a resolved content state.

At operation 822, the content interaction manager (e.g., content interaction manager 122A) may optionally request user confirmation of the resolved edit and the resolved content state and/or that the user provide a manual update to resolve the incompatibility by transmitting a notification to one or more of the user devices (e.g., user devices 102 and 104) to view and confirm the resolved edit and resolved content state. If the notification is sent flow progresses to operation 824, where the user may provide input on their respective user device to confirm or reject the resolved edit and/or resolved content state as well as providing a manual update to resolve the incompatibility. Operations 822 and 824 are shown with dashed lines to indicate that they are optional and may be omitted.

If at operation 822 the notification requesting user confirmation is not sent, and following operation 824 flow progresses to operation 826, where the content interaction manager (e.g., content interaction manager 122A) transmits the resolved edit the content interaction manager (e.g., content interaction manager 124B) of the other device (e.g., user device 104). When the resolved edit is applied by the other device, the content states at each device should be the resolved content state.

Returning to operation 816, if the local edit was first, flow progresses to operation 828 where it is determined if the received edit is deterministic. If the received edit is deterministic then flow progresses to operation 830, where the command processor (e.g., command processor 124A) will apply the received edit based on the received command records to create a resolved edit in a resolved content state. Again, because the received edit is deterministic and all user devices (e.g., user devices 102 and 104) have the received edit there is no need to transmit the resolved edit and/or resolved content state because they can be generated at each device.

Returning to operation 828 if the received edit is not deterministic then flow progresses to operation 832, where the content interaction manager (e.g., content interaction manager 122A) determines if the received edit is a resolved edit. In some instances, the content interaction manager may receive an edit that is from another user device (e.g., user device 104) that is not a resolved edit but where the local edit occurred first in time. In this instance, because the other user device (e.g., user device 104) has an IRE (e.g., IRE 120B) flow will progress to operation 834 and the content interaction manager will wait until it receives the resolved edit created by the IRE on the other user device and apply that resolved edit.

Returning to operation 832, when the content interaction manager (e.g., content interaction manager 122A) determines that the received edit is the resolved edit, flow progresses to operation 836 where the command processor (e.g., command processor 124A) applies the resolved edit to the content to create the resolved edit. Again, because the received edit is the resolved edit and all user devices (e.g., user devices 102 and 104) have the resolved edit there is no need to transmit the resolved edit and/or resolved content state.

Figure 9:
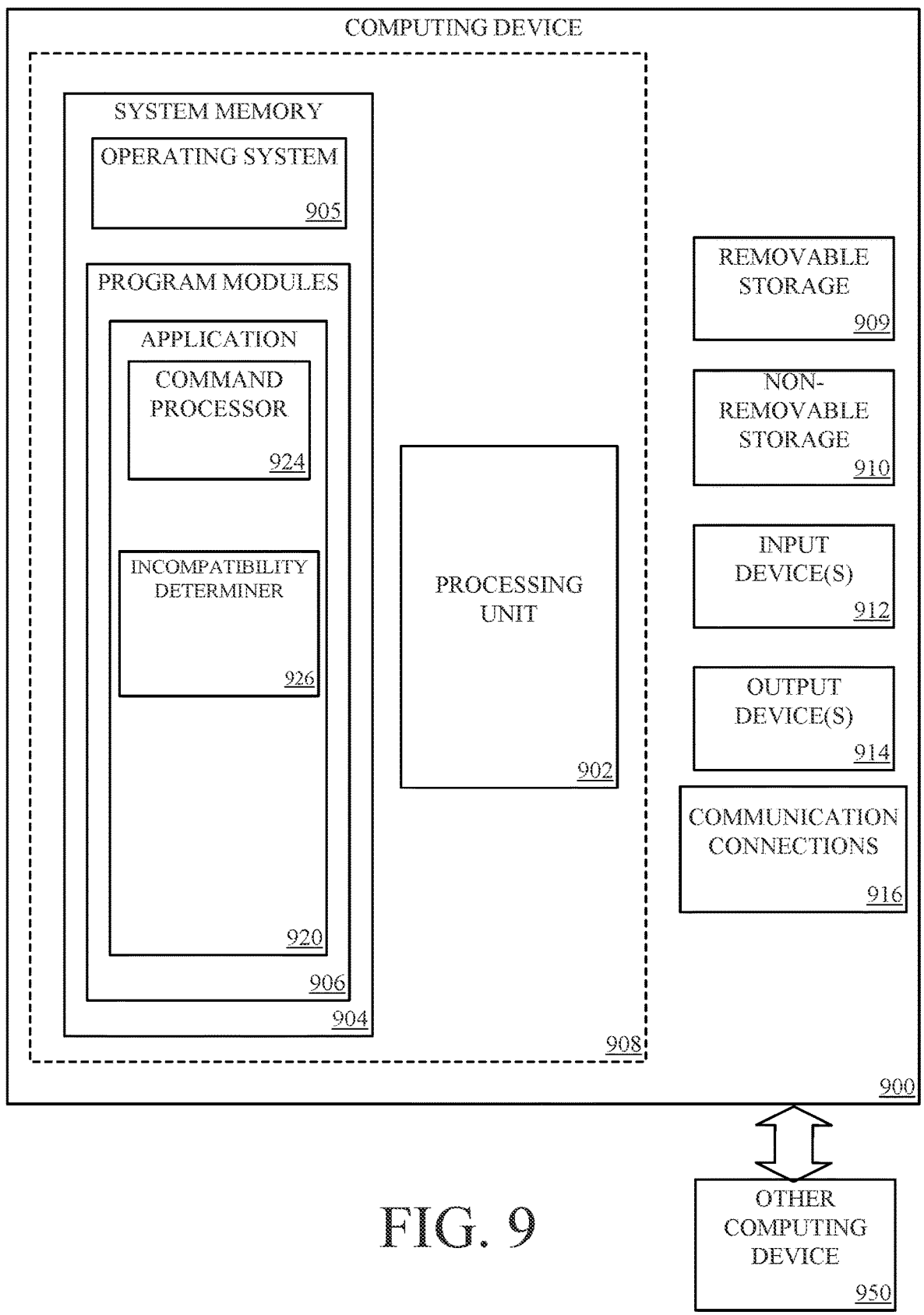
FIG. 9 illustrates a block diagram illustrating example physical components of a computing device with which aspects of the disclosure may be practiced.
Figure 10:
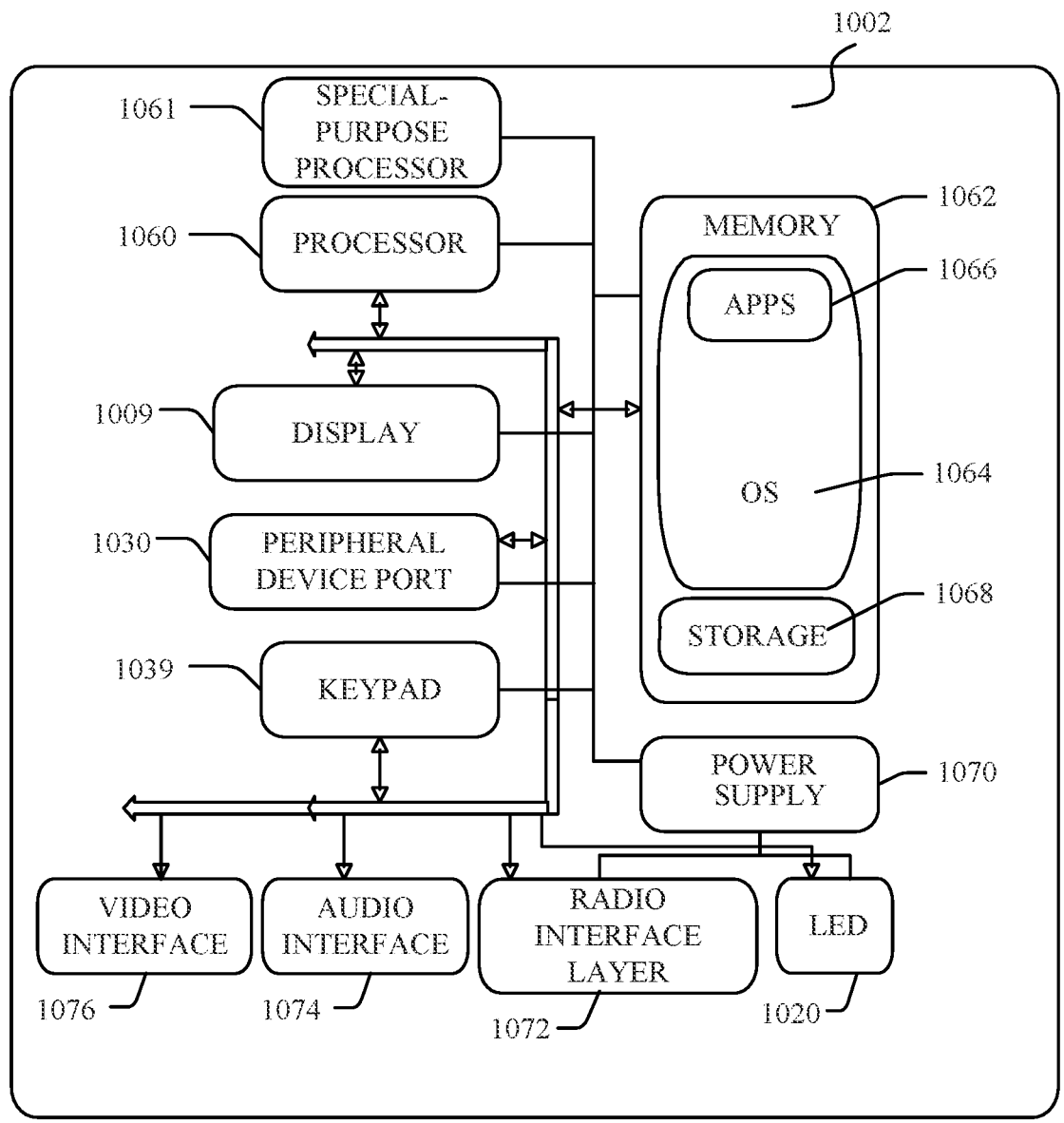
FIG. 10 illustrates a simplified block diagrams of a computing device with which aspects of the present disclosure may be practiced.
Figure 11:
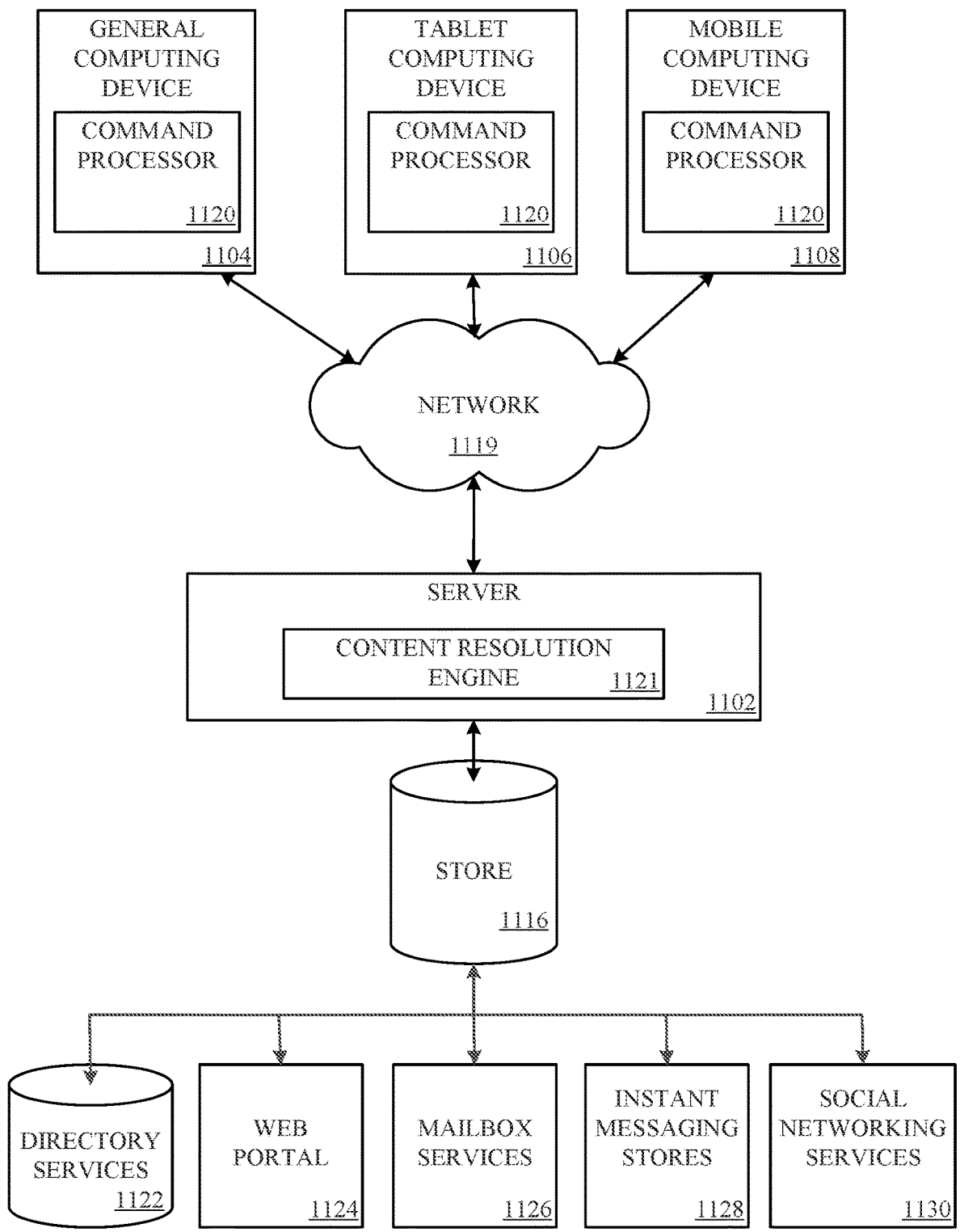
FIG. 11 is a simplified block diagram of a distributed computing system in which aspects of the present disclosure may be practiced.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above, including computing device 104 in FIG. 1. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store command processor 924 and/or incompatibility determiner 926. The operating system 905, for example, may be suitable for controlling the operation of the computing device 900.

Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 10 is a block diagram illustrating the architecture of one aspect of a computing device. That is, the computing device can incorporate a system (e.g., an architecture) 1002 to implement some aspects. In some examples, the system 1002 is implemented as a "smart phone" capable of running one or more applications (e.g., browser, e-mail, calendaring, contact managers, messaging clients, games, and media clients/players). In some respects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., an embedding object memory insertion engine, an embedding object memory retrieval engine, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and/or special-purpose processor 1061 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A computing device implementing the system 1002 may have additional features or functionality. For example, the computing device may also include additional data storage devices (removable and/or non-removable) such as, magnetic disks, optical disks, or tape. Such additional storage is illustrated in FIG. 10 by the non-volatile storage area 1068.

Data/information generated or captured by the computing device and stored via the system 1002 may be stored locally on the computing device, as described above, or the data may be stored on any number of storage media that may be accessed by the device via the radio interface layer 1072 or via a wired connection between the computing device and a separate computing device associated with the computing device, for example, a server computer in a distributed computing network, such as the Internet. As should be appreciated such data/information may be accessed via the computing device via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1124, a web portal 1125, a mailbox service 1126, an instant messaging store 1128, or a social networking site 1130.

A command processor 1120 (e.g., similar to the command processor 124) may be employed by a client that communicates with server device 1102. Additionally, or alternatively, content resolution engine 1121 may be employed by server device 1102. The server device 1102 may provide data to and from a client computing device such as a personal computer 1104, a tablet computing device 1106 and/or a mobile computing device 1108 (e.g., a smart phone) through a network 1119. By way of example, the computer system described above may be embodied in a personal computer 1104, a tablet computing device 1106 and/or a mobile computing device 1108 (e.g., a smart phone). Any of these examples of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, cause the system to perform a set of operations, the set of operations comprising:
      maintain a piece of content in an original content state for collaborative use by a plurality of users;
      receive a first edit of the content in a first content state having a first set of command records from a first device;
      receive a second edit of the content in a second content state having a second set of command records from a second device;
      when the first edit and the second edit are incompatible:
         apply the first edit to the content in the original content state to match the first content state;
         create a resolved edit of the content in a resolved content state by modifying the second edit based on the second set of command records on the content in the first content state, the modifying the second edit comprising adjusting the second set of command records associated with the second edit such that the second edit is applicable to the first content state; and
         transmit the resolved edit to each of the first device and second device,
         wherein the resolved edit includes a first resolved edit and a second resolved edit, the first resolved edit is applicable to the content in the first content state to match the resolved content state, and the second resolved edit is applicable to the content in the second content state to match the resolved content state.

2. The system of claim 1, wherein the first and second sets of command records comprise a recursive record of the commands called by each command.

3. The system of claim 1, wherein the first and second sets of command records comprise one or more anchors.

4. The system of claim 1, wherein the first and second sets of command records comprise one or more creation descriptors.

5. The system of claim 1, wherein the first and second sets of command records comprise one or more invariant parameters.

6. The system of claim 1, wherein the first and second sets of command records comprise one or more observations.

7. The system of claim 1, wherein the first and second sets of command records comprise one or more constraints.

8. A method comprising:
   maintaining a piece of content in an original content state for collaborative use by a plurality of users;
   receiving a first edit of the content in a first content state having a first set of command records from a first device;
   receiving a second edit of the content in a second content state having a second set of command records from a second device;
   when the first edit and the second edit are incompatible:
      applying the first edit to the content in the original content state to match the first content state;
      creating a resolved edit of the content in a resolved content state by modifying the second edit based on the second set of command records on the content in the first content state, the modifying the second edit comprising adjusting the second set of command records associated with the second edit such that the second edit is applicable to the first content state; and
      transmitting the resolved edit to each of the first device and second device,
      wherein the resolved edit includes a first resolved edit and a second resolved edit, the first resolved edit is applicable to the content in the first content state to match the resolved content state, and the second resolved edit is applicable to the content in the second content state to match the resolved content state.

9. The method of claim 8, wherein the first and second sets of command records comprise a recursive record of the commands called by each command.

10. The method of claim 8, wherein the first and second sets of command records comprise one or more anchors.

11. The method of claim 8, wherein the first and second sets of command records comprise one or more creation descriptors.

12. The method of claim 8, wherein the first and second sets of command records comprise one or more invariant parameters.

13. The method of claim 8, wherein the first and second sets of command records comprise one or more observations and one or more constraints.

14. A computer storage media including instructions, which when executed by a processor, cause the processor to:
   maintain a piece of content in an original content state for collaborative use by a plurality of users on a local device;
   apply a local command to the content in the original content state to create a local content state;
   create a local edit including a local set of command records based on the local command;
   transmit the local edit to a different device;
   receive an edit of the content in a received content state having a received set of command records from the different device; and
   when the local edit and the received edit are incompatible:
      create a resolved edit of the content in a resolved content state by modifying the received edit based on the received set of command records on the content in the local content state, the modifying the received edit comprising adjusting the received set of command records associated with the received edit such that the received edit is applicable to the local content state;
      wherein the resolved edit includes a first resolved edit and a second resolved edit, the first resolved edit is applicable to the content in the local content state to match the resolved content state, and the second resolved edit is applicable to the content in the received content state to match the resolved content state.

15. The computer storage media of claim 14, wherein the local and received sets of command records comprise a recursive record of the commands called by each command.

16. The computer storage media of claim 14, wherein the received set of command records comprise one or more anchors.

17. The computer storage media of claim 14, wherein the local and received sets of command records comprise one or more creation descriptors.

18. The computer storage media of claim 14, wherein the local and received sets of command records comprise one or more invariant parameters.

19. The computer storage media of claim 14, wherein the local and received sets of command records comprise one or more observations.

20. The computer storage media of claim 14, wherein the local and received sets of command records comprise one or more constraints.

\* \* \* \* \*